(12) United States Patent
Bacus et al.

(10) Patent No.: US 7,792,338 B2
(45) Date of Patent: Sep. 7, 2010

(54) METHOD AND APPARATUS OF MECHANICAL STAGE POSITIONING IN VIRTUAL MICROSCOPY IMAGE CAPTURE

(75) Inventors: James V. Bacus, Downers Grove, IL (US); James W. Bacus, Oakbrook, IL (US)

(73) Assignee: Olympus America Inc., Center Valley, PA (US)

( * ) Notice: Subject to any disclaimer, the term of this patent is extended or adjusted under 35 U.S.C. 154(b) by 918 days.

(21) Appl. No.: 11/202,045

(22) Filed: Aug. 11, 2005

(65) Prior Publication Data

US 2006/0034543 A1    Feb. 16, 2006

Related U.S. Application Data

(60) Provisional application No. 60/601,794, filed on Aug. 16, 2004, provisional application No. 60/605,583, filed on Aug. 30, 2004.

(51) Int. Cl.
*G06K 9/00* (2006.01)
*G06K 9/36* (2006.01)

(52) U.S. Cl. .................................. 382/128; 382/284

(58) Field of Classification Search ......... 382/128–134, 382/284, 294, 305, 312; 348/79; 250/461.2; 359/395
See application file for complete search history.

(56) References Cited

U.S. PATENT DOCUMENTS

| | | |
|---|---|---|
| 3,999,047 A | 12/1976 | Green |
| 4,150,360 A | 4/1979 | Kopp et al. |
| 4,175,860 A | 11/1979 | Bacus |
| 4,199,748 A | 4/1980 | Bacus |
| 4,213,036 A | 7/1980 | Kopp et al. |
| 4,523,278 A | 6/1985 | Reinhardt et al. |
| 4,742,558 A | 5/1988 | Ishibashi et al. |

(Continued)

FOREIGN PATENT DOCUMENTS

EP    0209422    1/1987

(Continued)

OTHER PUBLICATIONS

Laferty, Donald R., Digital Composite Imaging For High Resolution Specimen Analysis, The Journal of NIH Research, Nov. 3, 1994, p. 78, vol. 6 No. 11.

(Continued)

*Primary Examiner*—Kanji Patel
(74) *Attorney, Agent, or Firm*—Volpe and Koenig, P.C.

(57) ABSTRACT

A method and apparatus for creating a magnified composite image of a microscope specimen comprises making error corrections for imprecise movements of the specimen relative to an objective lens when capturing data for first and second images. A correction offset is computed based on a comparison of data for overlapped portions of the first and second images and then the specimen is moved through a distance modified by the correction offset for capture of a subsequent tiled image. Image center portions are retained as the data structure tile. The area about the center portion is used to align images and to compensate for stage inaccuracies and to provide a feedback signal for a drive system. Differences in X, Y coordinates for macro and micro view images may be used as navigation offsets to view a selected point for the micro image marked on the macro image.

9 Claims, 17 Drawing Sheets

U.S. PATENT DOCUMENTS

| | | |
|---|---|---|
| 4,760,385 A | 7/1988 | Jansson |
| 4,777,525 A | 10/1988 | Preston, Jr. |
| 4,887,892 A | 12/1989 | Bacus |
| 5,018,209 A | 5/1991 | Bacus |
| 5,068,906 A | 11/1991 | Koska |
| 5,072,382 A | 12/1991 | Kamentsky |
| 5,073,857 A | 12/1991 | Peters et al. |
| 5,099,521 A | 3/1992 | Kosaka |
| 5,107,422 A | 4/1992 | Kamentsky et al. |
| 5,123,056 A | 6/1992 | Wilson |
| 5,163,095 A | 11/1992 | Kosaka |
| 5,216,500 A | 6/1993 | Krummey et al. |
| 5,216,596 A | 6/1993 | Weinstein |
| 5,218,645 A | 6/1993 | Bacus |
| 5,252,487 A | 10/1993 | Bacus et al. |
| 5,257,182 A | 10/1993 | Luck et al. |
| 5,260,871 A | 11/1993 | Goldberg |
| 5,268,966 A | 12/1993 | Kasdan |
| 5,287,272 A | 2/1994 | Rutenberg et al. |
| 5,297,034 A | 3/1994 | Weinstein |
| 5,313,532 A | 5/1994 | Harvey et al. |
| 5,333,207 A | 7/1994 | Rutenberg |
| 5,428,690 A | 6/1995 | Bacus et al. |
| 5,473,706 A | 12/1995 | Bacus et al. |
| 5,499,097 A | 3/1996 | Ortyn et al. |
| 5,505,946 A | 4/1996 | Kennedy et al. |
| 5,544,650 A | 8/1996 | Boon et al. |
| 5,625,765 A | 4/1997 | Ellenby et al. |
| 5,655,029 A | 8/1997 | Rutenberg |
| 5,687,251 A | 11/1997 | Erler et al. |
| 5,793,969 A | 8/1998 | Kamentsky et al. |
| 5,796,861 A | 8/1998 | Vogt et al. |
| 5,836,877 A | 11/1998 | Zavislan |
| 5,838,837 A | 11/1998 | Hirosawa et al. |
| 5,874,162 A | 2/1999 | Bastian et al. |
| 5,978,804 A | 11/1999 | Dietzman |
| 5,993,001 A | 11/1999 | Bursell et al. |
| 6,049,421 A | 4/2000 | Raz et al. |
| 6,078,681 A | 6/2000 | Silver |
| 6,091,842 A | 7/2000 | Domanik et al. |
| 6,091,930 A | 7/2000 | Mortimer et al. |
| 6,101,265 A | 8/2000 | Bacus et al. |
| 6,148,096 A | 11/2000 | Pressman et al. |
| 6,151,405 A | 11/2000 | Douglass et al. |
| 6,272,235 B1 | 8/2001 | Bacus et al. |
| 6,396,941 B1 | 5/2002 | Bacus et al. |
| 6,404,906 B2 * | 6/2002 | Bacus et al. ............... 382/128 |
| 6,430,309 B1 | 8/2002 | Pressman et al. |
| 6,522,774 B1 * | 2/2003 | Bacus et al. ............... 382/133 |
| 6,674,881 B2 * | 1/2004 | Bacus et al. ............... 382/128 |
| 6,674,884 B2 * | 1/2004 | Bacus et al. ............... 382/133 |
| 6,711,283 B1 | 3/2004 | Soenksen |
| 6,775,402 B2 * | 8/2004 | Bacus et al. ............... 382/133 |
| 6,816,606 B2 | 11/2004 | Wetzel et al. |
| 6,917,696 B2 | 7/2005 | Soenksen |
| 7,027,628 B1 | 4/2006 | Gagnon et al. |
| 7,035,478 B2 | 4/2006 | Crandall et al. |
| 7,110,586 B2 * | 9/2006 | Bacus et al. ............... 382/128 |
| 7,116,440 B2 | 10/2006 | Eichhorn et al. |
| 7,146,372 B2 * | 12/2006 | Bacus et al. ............... 707/100 |
| 7,149,332 B2 * | 12/2006 | Bacus et al. ............... 382/128 |
| 2002/0097898 A1 | 7/2002 | Brown et al. |
| 2004/0114218 A1 | 6/2004 | Karlsson et al. |
| 2004/0119817 A1 * | 6/2004 | Maddison et al. ............. 348/79 |

FOREIGN PATENT DOCUMENTS

| | | |
|---|---|---|
| JP | 02004285 | 1/1990 |
| JP | 05303621 | 11/1993 |
| JP | 05313071 | 11/1993 |
| JP | 06003601 | 1/1994 |
| JP | 06051209 | 2/1994 |
| JP | 06118307 | 4/1994 |
| JP | 07015721 | 1/1995 |
| JP | 07333522 | 12/1995 |
| WO | 01/27679 A1 | 4/2001 |

OTHER PUBLICATIONS

The CAS 200 Multiscan Automated Pathology Workstation by James V. Bacus, Compendium on the Computerized Cytology and Histology Laboratory, Tutorials of Cytology 1994.

"Biomarkers of Permalignant Breast Disease and Their Use as Surrogate Endpoints in Clinical Trails of Chemopreventive Agents" The Breast Journal, vol. 1, No. 4, pp. 228-235 (1995), Charges W. Boone and Gary J. Kelloff, 8 pages.

"Markovian Analysis of Cervical Cell Images" The Journal of Histochemistry and Cytochemistry, vol. 24, No. 1, pp. 138-144 (1976), Normal J. Pressman, 7 pages.

FlashPix Format Specification, Version 1.0 1996 Eastman Kodak Company.

Westerkamp et al., Non-Distorted Assemblage of the Digital Images of Adjacent Fields of Histological Sections, Analytical Cellular Pathology, 5 (1993) 235-247.

Becker et al., Automated 3-D Montage Synthesis from Laser-Scanning Confocal Images: Application to Quantitative Tissue-Level Cytological Analysis, Cytometry 25:235-245 (1996).

Carr, Plaisant and Hasegawn, Usability Experiments for the Redesign of a Telepathylogy Workstation, Human-Computer Interaction Laboratory, May 1994.

Grimes et al., Applications of Advanced Imaging Technology in Pathology, Advanced Imaging, pp. 13-16, Jul. 1997.

Weinstein, Conference Overview and Commentary, Cell Vision, vol. 3, No. 6 (1996) pp. 442-446.

Dunn et al., Dynamic-Robotic Telepathology: Department of Veterans Affairs Feasibility Study, Human Pathology vol. 28 No. 1, Jan. 1997.

McCellan et al., A Prototype System for Telepathology, Procedures of First Annual Telepathology Conference, pp. 208-215, Oct. 1996.

Schwarzmann et al., Field Test to Evaluate Telepathology in Telemedicine and Telecare, vol. 2, Supplement 1, 1996.

Imaging Research, Inc. Titled Field Mapping the TFM Module, Oct. 22, 1995.

Winokur et al., Prototype Telepathology System Combining Features of Dynamic and Static Telepathology, Cell Vision, vol. 3, No. 6 (1996).

Silage et al., The Use of Touch-Sensitive Screen in Interactive Morphometry, Journal of Microscopy, vol. 134, Ft. 3, Jun. 1984, pp. 315-321.

Barnea et al., A Class of Algorithms for Fast Digital Image Registration, IEEE Transactions on Computers, vol. c-21, No. 2, pp. 179-186.

D. Milgram, Computer Methods for Creating Photomosaics, IEEE Transactions on Computers, Nov. 1975.

D. Milgram, Adaptive Techniques for Photo Mosaicking, IEEE Transactions on Computers, L. C-26, No. 11, Nov. 1977.

L. Brown, A Survey of Image Registration Techniques, ACM Computing Surveys, vol. 24, No. 4, Dec. 1992.

Prince et al., Analysis of Spatial Order in Sandstones II: Grain Cluster, Packing Flaws, and the Small-Scale Structure of Sandstones, Journal of Sedimentary Research, Jan. 1995.

University of Alabama Binningham, UAB and ell South partnership Moves to Make Telepathology a Reality, UAB News (1995).

Young, S.J. et al., "Implementing a Cooaboratory for Microscopic Digital Anatomy", International Journal of Supercomputer Applications and High Performance Computing, Summer-Fall 1996, Dage Periodicals Press, USA, vol. 10, pp. 170-181.

Fan G.Y. et al., "Telemicroscopy", Ultramicroscopy, Dec. 1993, Netherlands, vol. 52, pp. 499-503.

Szeliski R: *"Image Mosaicing for Tele-Reality Applications"* Proceedings of the IEEE Workshop on Applications of Computer Vision, XX, XX, May 1, 1994, pp. 44-53, XP 002048809.

Krishnan A et al.: *"Panoramic Image Acquisition"* Proceedings 1996 IEEE Computer Society Conference on Computer Vision and Pattern Recognition (CAT No. 96CB35909), Proceedings of IEEE Conference on Computer Vision and Pattern Recognition, San Francisco, CA, USA Jun. 18-20, 1996.

Silage, D et al., *"Digital Image Tiles: A Method for the Processing of Large Sections"* Journal of Microscopy, vol. 138, Pt 2, May 1985, pp. 221-227.

Henderson, E. *"Image Acquisition of Microscopic Slides,"* Spie vol. 2173: pp. 21-27.

Szeliski et al.; *"Direct Methods for Visual Scene Reconstruction"* Digital Equipment Corporation Cambridge Research Lab, pp. 26-33, Jun. 24, 1995.

Dani et al.: "Automated Assembling of Images: Image Montage Preparation" Department of Electrical Engineering, Indian Institute of Technology, pp. 431-445, Oct. 24, 1993.

Supplementary European Search Report dated Sep. 17, 2009.

Henderson, E. *"Image Acquisition of Microscopic Slides,"* Spie vol. 2173: pp. 21-27, May 1994.

\* cited by examiner

For 2/3" digital sensor

|  | Width | Height | Objective Magnification | Image Plane Pixel Size (um) |
|---|---|---|---|---|
| um | 8800 | 6600 | 10 | 0.6875 |
| Pixels | 1280 | 960 | 20 | 0.34375 |
| Pixel size | 6.875 | 6.875 | 40 | 0.171875 |

FIG. 6A

Stage Steps at 1.25 um

| Objective Magnification | Image width (um) at 752 pixels | Image height (um) at 480 pixels | Width | Height |
|---|---|---|---|---|
| 10 | 517 | 330 | 413.6 | 264 |
| 20 | 258.5 | 165 | 206.8 | 132 |
| 40 | 129.25 | 82.5 | 103.4 | 66 |

FIG. 6B

METHOD AND APPARATUS OF MECHANICAL STAGE POSITIONING IN VIRTUAL MICROSCOPY IMAGE CAPTURE

CROSS-REFERENCE TO RELATED APPLICATION

This application claims the benefit of U.S. Provisional Application Ser. No. 60/601,794, filed Aug. 16, 2004 and U.S. Provisional Application Ser. No. 60/605,583, filed Aug. 30, 2004, which are incorporated by reference in their entirety herein.

FIELD OF THE INVENTION

This invention relates to a method, system, and apparatus for image capture of a virtual microscope slide, and more particularly for capturing a virtual microscope slide with a microscope stage platform having a low resolution x and y mechanical movement, and without optical encoder positional feedback control.

DESCRIPTION OF THE RELATED ART

Today, manufacturers are making digital microscopes to acquire virtual microscope slides. Two such systems are the BLISS System by Bacus Laboratories, Inc., Lombard, Ill., and the Scanscope System by Aperio technologies, Vista, Calif. The digital microscopes are typically operated by a computer with an application program that controls the microscope. Moreover, the virtual slides produced by the digital microscopes can be hosted by an Intranet Server to a network, such as an intranet or the Internet. Thus, the physical slide with the use of these digital microscopes can easily be scanned by users, and the captured slide images can be recorded in a data structure of a virtual slide, which can then be viewed by other users on a network. The physical slide, in essence, becomes a virtual microscope slide. For a more detailed description of a virtual microscope slide, please refer to a prior U.S. Pat. Nos. 6,101,265 and 6,272,235 issued to the current inventors, which are incorporated in their entirety by reference.

Viewing a specimen through a common optical microscope, the field of view is the area of the illuminated field diaphragm of the microscope optical system as viewed in the specimen plane using an objective lens for magnification. The field of view is further limited by the visual field diaphragm usually contained in the eyepiece. The field of view decreases dramatically with increasing magnification using a higher power objective lens. In a digital imaging microscope the field of view is the area of the illuminated field diaphragm of the microscope optical system as viewed in the specimen plane using a magnifying objective and is further limited by the sensing area of the image capture device. A virtual slide is a stored microscope image or image data structure recorded in multiple parts at high magnification to capture an area of a specimen on a microscope slide that is larger than the area of the field of view in the specimen plane of the optical system used in the recording. The multiple image fields are captured by moving the slide mounted on a stage platform into the field of view for each image capture such that side by side contiguous image fields can be reconstructed or stored as if they were continuous. This virtual slide stored image or image data structure enables viewing through a display screen the reconstructed digital image of the area recorded or portions thereof. When viewed using a display screen the digital image of the stored image or image data structure can be changed to view different portions of the specimen, or changed to higher or lower digital magnifications to view with different resolutions. The capture of magnified images of the specimen is accomplished by capturing multiple data segments, usually called image tiles or image strips that need to be accurately aligned to provide a seamless magnified corporate image to the viewer. Virtual slides described in the prior art are captured with a rectangular sensor, such as a 752 by 480 pixel sensor, or by a linear sensor moved in one axis of the scan direction by a mechanical stage, such as a 1 by 1024 pixel sensor. Both methods are limited with regard to the size of image that can be captured at one time by the size of the optical field of view without moving the stage to perform the subsequent image captures. In the systems disclosed in the aforesaid patents and in the present system, a digital microscope system having a motorized stage is used to capture and save image data to provide the data structure of the overall image comprised of aligned segments or tiles. These systems are expensive, with one of the major components being the highly precise stages necessary to preserve image alignment. A significantly less expensive digital microscope is one sold by the Nikon Corporation under the trademark COOLSCOPE. Generally, the accuracy of the motorized stage of a digital microscope such as the COOLSCOPE is sacrificed in order to make it less expensive and they have not been used for virtual slide capture. However, one of the advantages of this relatively inexpensive digital microscope is a much larger 5 megapixel rectangular image sensor of 1280 by 960 pixels.

The relationship between the digital resolution of the stepping stage platform and the resolution of the digital image sensor is critical with regard to obtaining a seamless alignment between sequential image captures. In the BLISS System, described in U.S. Pat. Nos. 6,101,265, 6,272,235 and 6,396,941 a seamless image is obtained by using a stepping stage of 0.1 µm resolution, with very precise feedback control and highly linear lead screws for positional accuracy. Thus, the resolution of the stage is higher than the digital resolution of the image pixels and alignment can easily be achieved. For example, at a magnification of 20× the digital resolution of the BLISS System is 0.5 µm. Since it takes 5 stage steps to travel the length of one pixel, an error of one stage step is not apparent in the final image. Additionally, such stages have feedback control to precisely maintain accuracy. Unfortunately, such highly precise stages are very expensive. Lower cost stages are available, for example at 1.0, 1.25 µm or 5 µm. However, this introduces a positional error related to the step size of the stage being larger than the size of the pixel element in the image plane. The stage can only move in incremental amounts which usually does not evenly match the image width in pixels, producing an error of several pixels between images.

Also, lower cost stages may have lead screws that may be made of materials that are not as linear as the precision metal ones used with optically encoded feedback position control stages. This introduces additional errors of non-linearity. A bowed, or curved, lead screw causes an undulating, or gradual shift in position relative to a precise linear path across the surface of the slide on the x, y planar surface of the stage platform. This error, and mechanical hysteresis, is usually corrected by expensive optical encoder feed back control. A deviation in linearity without optical encoder feedback control can result in stage specifications of 20 µm tolerances in positional reproducibility of results. This can cause alignment errors of as much as 40 pixels between images without feedback control.

This invention will be described in connection with the aforesaid digital microscope system COOLSCOPE which is relatively inexpensive compared to a system marketed by Bacus Laboratories, Inc., owner of the aforesaid patents. The alignment of image tiles described in the present invention are not limited to the COOLSCOPE system however and can be applied to other systems. Hence, the invention described and claimed herein is not limited to the COOLSCOPE which is described only by way of one example of the invention.

SUMMARY OF THE INVENTION

In accordance with the present invention, there is disclosed a new and less expensive method and apparatus, as contrasted to the prior art, for constructing a virtual microscope slide comprised of digitally scanned images from a microscope sample such as a tissue specimen or the like. This is achieved by replacing the conventional highly precise x and y stage platform with a significantly less accurate and less precise x and y stage platform and using a larger image sensor to provide feedback control to compensate for positioning inaccuracies. The larger image sensor enables a much larger image capture. By retaining only the center portion of the image as the virtual slide data structure tile, the larger area of image capture surrounding the center portion can be used to align images to compensate for stage inaccuracies and to provide a feedback control signal to replace the conventional optically encoded feedback control signal. The purpose of the feedback control is to maintain the capture image in the center of the larger imaged sensor so that overlapping areas for image alignment are always present.

BRIEF DESCRIPTION OF THE DRAWINGS

FIGS. 6A and 6B show exemplary values of different parameters of an image sensor and stage device;

DETAILED DESCRIPTION OF THE PREFERRED EMBODIMENT

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communication network. In a distributed computing environment, programs may be located in both local and remote memory storage devices.

Figure 1:
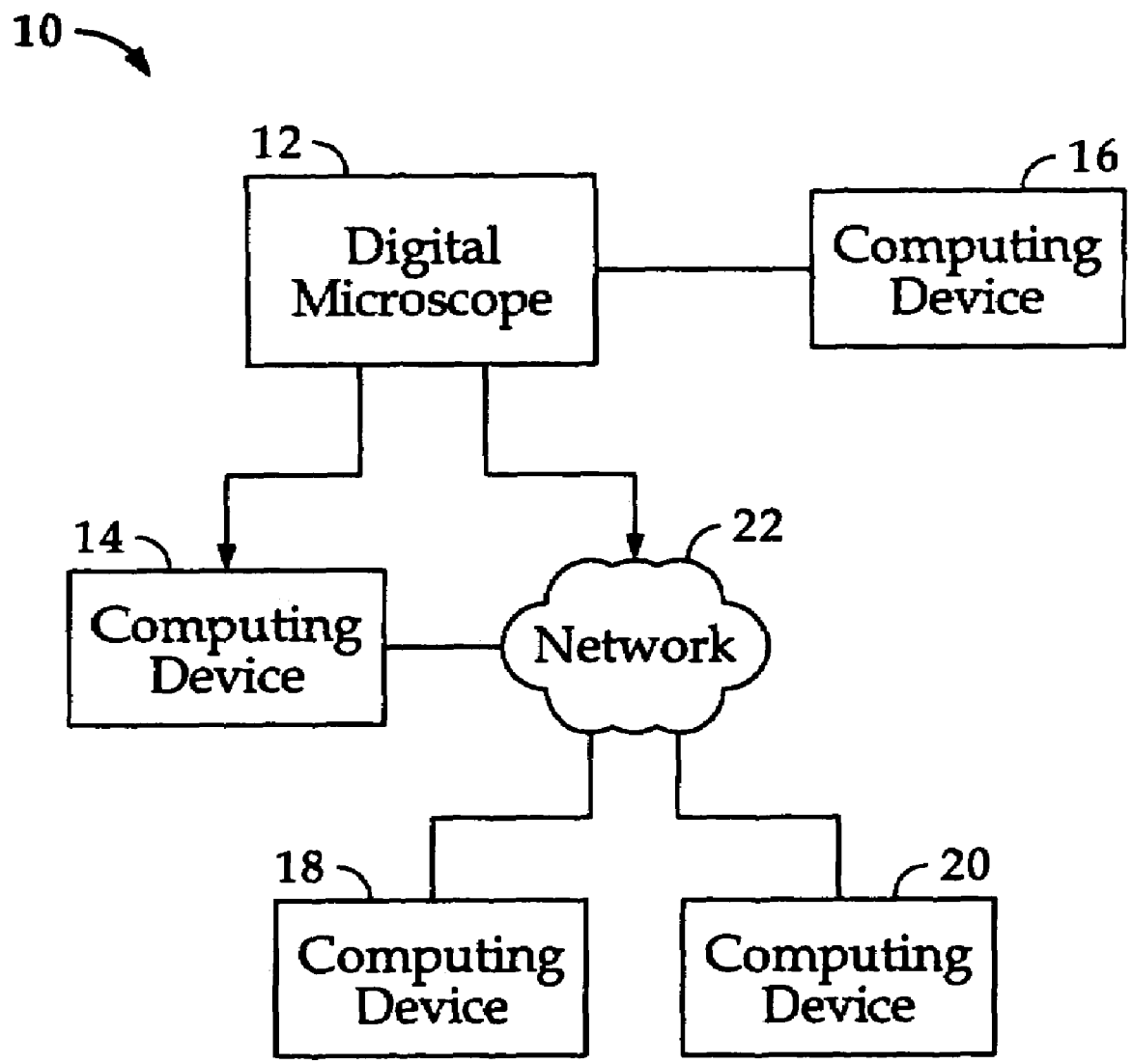
FIG. 1 shows an exemplary computer environment 10 in which the present invention can be implemented.

FIG. 1 shows an exemplary computer environment 10 in which the present invention can be implemented. In this general computer environment 10, a digital microscope 12 is connected directly to multiple computers 14, 16 and indirectly to other computers 18, 20 via a network 22. The network can include any type of computer network, such as an intranet or the Internet. Although one digital microscope 12 is shown as an example, the system can include multiple microscopes connected to multiple computers or a single computer. Because the topology of the computer environment 10 can be greatly varied, the present system is shown as an example. The computer environment 10 can be as stripped down to a single computer connected directly to the digital microscope 12 without a network, or a vast computing network with hundreds of computers and digital microscopes being interconnected. As a result, as one skilled in the art would readily appreciate, other computer environments are contemplated, and these various computer environments are within the scope of the present invention.

Figure 2:
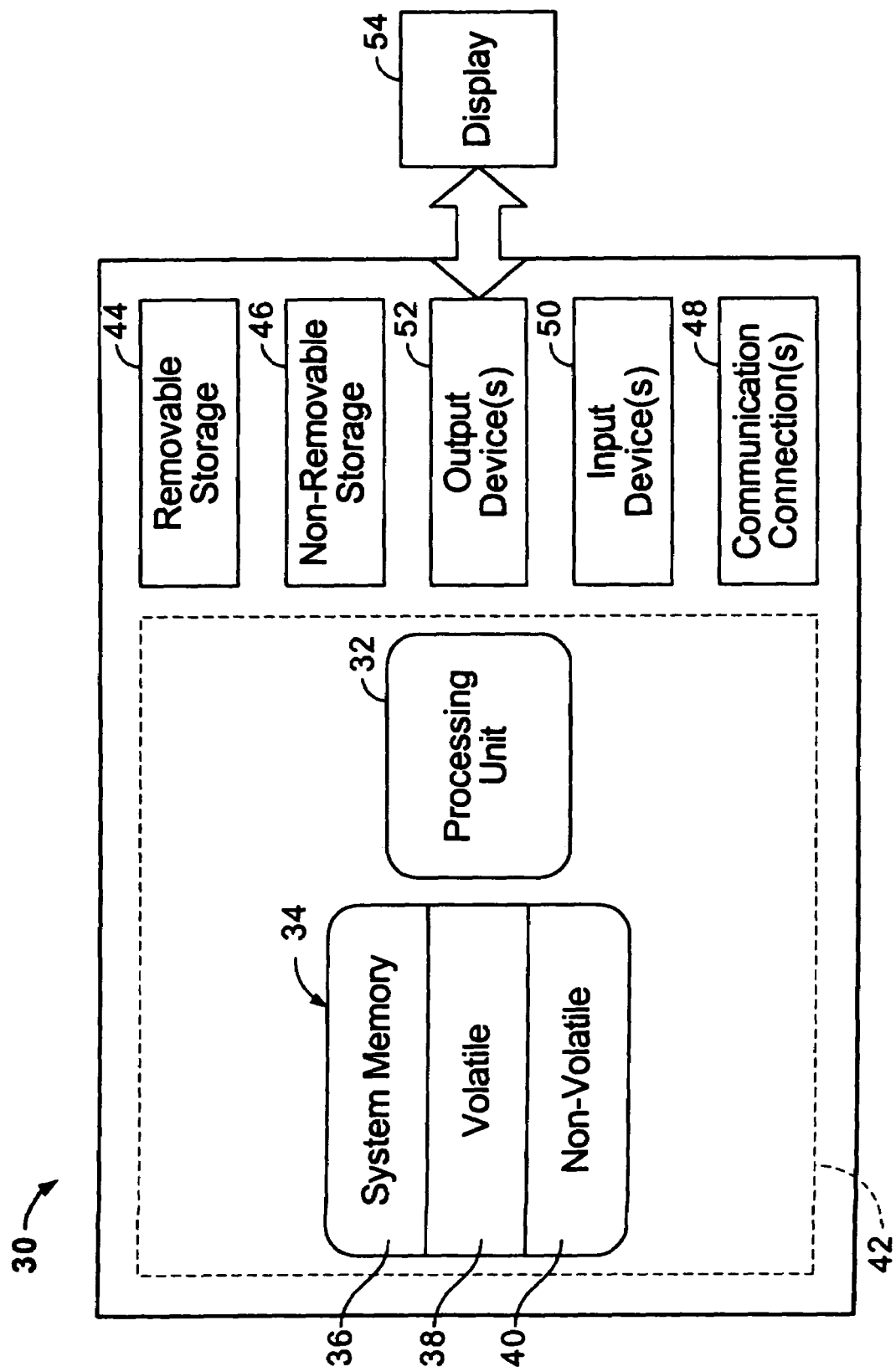
FIG. 2 shows a general configuration for the computers shown in FIG. 1, where all or parts of the invention may be implemented.

FIG. 2 shows a general configuration for the computers 14, 16, 18, 20 shown in FIG. 1 and indicated generally at 30, where all or parts of the invention may be implemented. As an example, in its most basic configuration, the computer 14 may include at least one processing unit 32 and memory 34. The processing unit 32 executes instructions to carry out tasks in accordance with various embodiments of the invention. In carrying out such tasks, the processing unit 32 may transmit electronic signals to other parts of the computer 14 and to devices outside of the computer 14 to cause some result. Depending on the exact configuration and type of the computer 14, the memory 34 may be system memory 36, volatile memory 38 (e.g., Random Access Memory "RAM"), or non-volatile memory 40 (e.g., Read-Only Memory "ROM" or flash memory). This most basic configuration is illustrated in FIG. 2 by dashed line 42.

The computer 14 may also have additional features/functionality. For example, computer 14 may also include a removable 44 and/or non-removable 46 storage media, which includes for example, magnetic disks or tapes and/or optical disks or tapes. These computer storage media can be implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store the desired information and can be accessed by the computer 14. Any such computer storage media may be part of computer 14.

Computer 14 preferably also contains communication connections 48 that allow the computer to communicate with other computers and/or devices. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media. Computer 14 may also have input devices 50 such as a keyboard, mouse, pen, voice input device, touch input device, etc. Output devices 52 such as a display 54, speakers, a printer, or a peripheral device may also be included. All of these devices are well known in the art.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computer, which reconfigures or otherwise alters the operation of the computing device in a manner well understood by those skilled in the art. The data structures, where data are maintained, are physical locations of the memory that have particular properties defined by the format of the data. However, while the invention is being described in the foregoing context, it is not meant to be limiting as those of skill in the art will appreciate that a variety of the acts and operations described hereinafter may also be implemented in hardware.

Figure 3:
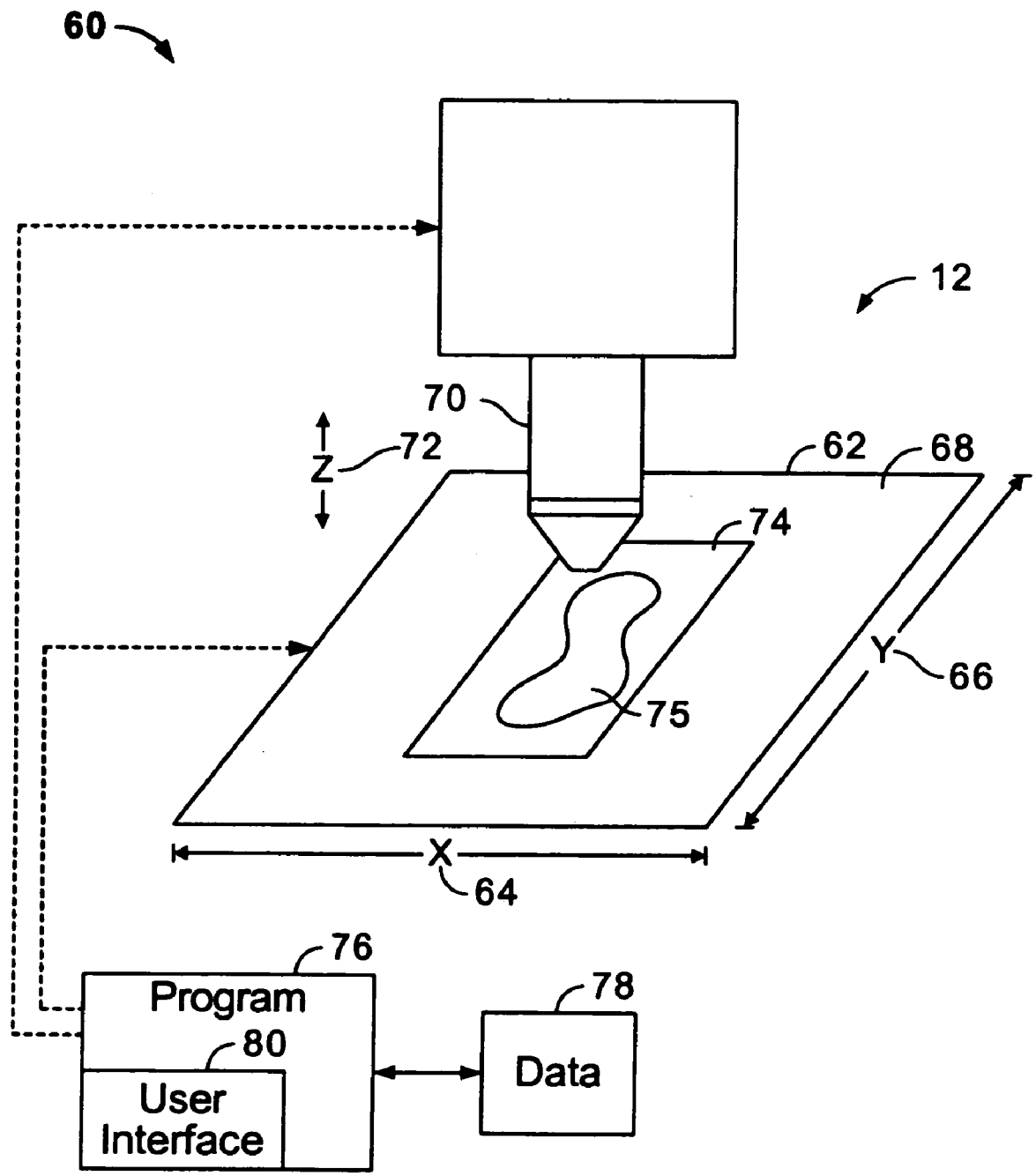
FIG. 3 is an overview diagram of the digital microscope 12 implemented according to one embodiment of the present invention.

Referring now to FIG. 3, an overview diagram of the digital microscope 12 implemented according to one embodiment of the present invention is shown and indicated generally at 60. The microscope 12 includes a stage 62 that provides an x and y axis 64 and 66 to move a region of a plane 68 and into the field of view of an objective lens 70 located on a z axis 72 perpendicular to the x, y axis plane. The stage 62 is configured to receive a slide 74 onto an area of the x, y axis plane 68. As shown, the digital microscope 12 is capable of moving the slide with a specimen 75 deposited thereon along the x, y axis 64, 66, which constitutes the stage coordinate, for capturing a field of view image at those specified coordinates. The digital microscope 12 can be adapted to move the stage 62, the lens 70, or a combination of the lens and stage to these stage coordinates. For example, the objective lens 70 can be adapted to move forward and downward on the z axis 72, and the stage 62 is adapted to move on the x and y axis 64, 66. Alternatively, either the stage 62 or the objective lens 70 can move in isolation to the defined stage coordinates on the x, y, and z axis 64, 66, 72. In the embodiment of the invention described herein the stage is moved to position the specimen under the objective lens and into the field of view.

In one embodiment of the present invention, a program 76 is used to create and send the proper instructions to the microscope 12 for controlling the available device functions. As one example, the program 76, using data 78 that may be permanently or temporary saved on the storage media, may send instructions with specified stage coordinates to the microscope 12 for capturing one or more field images at those specified stage coordinates. The program 76 may also send instructions to control other device functions, such as focus, transmission of data, or ejection of the slide. Basically, the program 76 is implemented to control most, if not all, of the device functions of the digital microscope 12. Depending upon the movement configuration of the digital microscope 12, the program 76 should have control over the mechanical parts of the device. The program 76 preferably includes a user interface 80 that allows for user control of the microscope 12.

Since the present invention contemplates the program 76 being, but not limited to, an implementation that is within the digital microscope 12, a separate computer connected to the device, a function of an application, or a web-based executable function, the program should be considered any program for use with a computer or a peripheral device. As a result, the implementation of the program includes software, firmware, modules within an application, and application program interface. Since these various implementations are contemplated and readily appreciated by one skill in the art, they are within the scope of the present invention.

Figure 4:
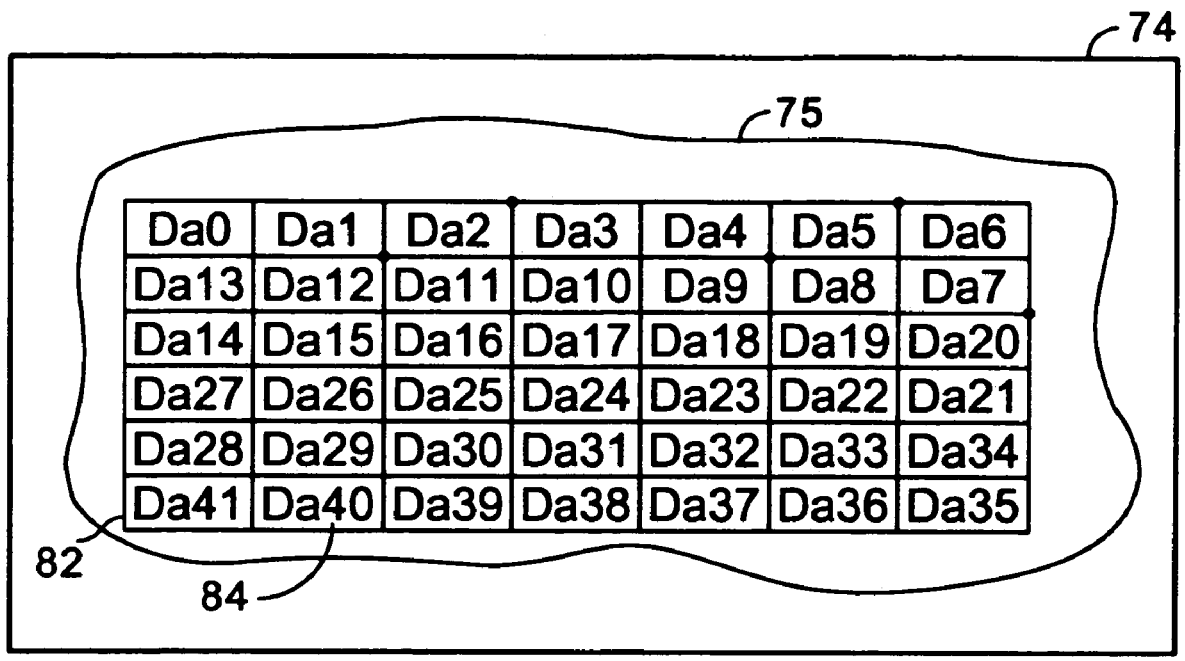
FIG. 4 depicts a rectangular region of an selected area of the slide according to one embodiment of the present invention.

FIG. 4 depicts a rectangular region 82 of the specimen 75 being selected according to one embodiment of the present invention. Initially, a macro view of the specimen 75 is captured, which enables a user to easily select a region of the specimen though the user interface. The relationship of the macro view and its use in selecting a region for higher magnification image capture is described the previous U.S. Pat. No. 6,101,265 by the present inventors. A similar method may be used in the present invention. Sometimes, as in the COOLSCOPE and other systems that use different optics to acquire the macro view, or in other systems that use different optics and sensors, there is a need to align the macro view image with a higher magnification image for accurate selection. A procedure of the this invention to accomplish this alignment is to select a small visually detectable object in the macro view image and click on it with the mouse pointer to obtain it's image pixel x,y coordinates. Then, after changing the magnification to obtain and image with a preliminary centration to acquire an image in the same general field of view of second higher resolution, for example at 20× and usually in a second viewing window, center the object in that window by scrolling, or automatic movement of the specimen relative to the optics, and record the x,y coordinates of the second higher magnification after the object is centered in the field of view and of the captured image. The difference relationship between the x,y coordinates of the macro view image and the higher magnification view image may then be used as offsets when navigating the macro view with the mouse pointer to look at different points at the higher magnification and to outline regions on the macro view for virtual slide capture at the higher magnification. The invention is not limited to the acquisition of a macro view however, but may be used in a system that simply scans the entire slide, or automatically locates the specimen region for image capture.

Depending upon the magnification requested by the capture, the selected region is divided into multiple tiles 84, which is indicated respectively as Da0 through Da41 in FIG. 4. For a higher magnification, e.g. at 40× magnification more tiles 84 are used to divide the selected region. Similarly, for the lower magnification, e.g. 5× magnification, fewer tiles 84 are used. The magnification used, and thus the number of tiles 84 used depends upon the specific needs in viewing the specimen. However, in general, if more details are desired, the greater magnification and number of tiles 84 would be used to divide the selected region. However, a complication arises when more tiles are used, in which case, the process will take more time and more image storage will be required. Thus, the benefits are weighted according to the inspection, magnification and resolution needs of the specific specimen, which is readily appreciated by a skilled artisan. The number of tiles used to divide the selected region determines the x and y coordinates of each tile and the x and y coordinate of the upper left tile is stored as a starting position for acquisition.

Figure 5A:
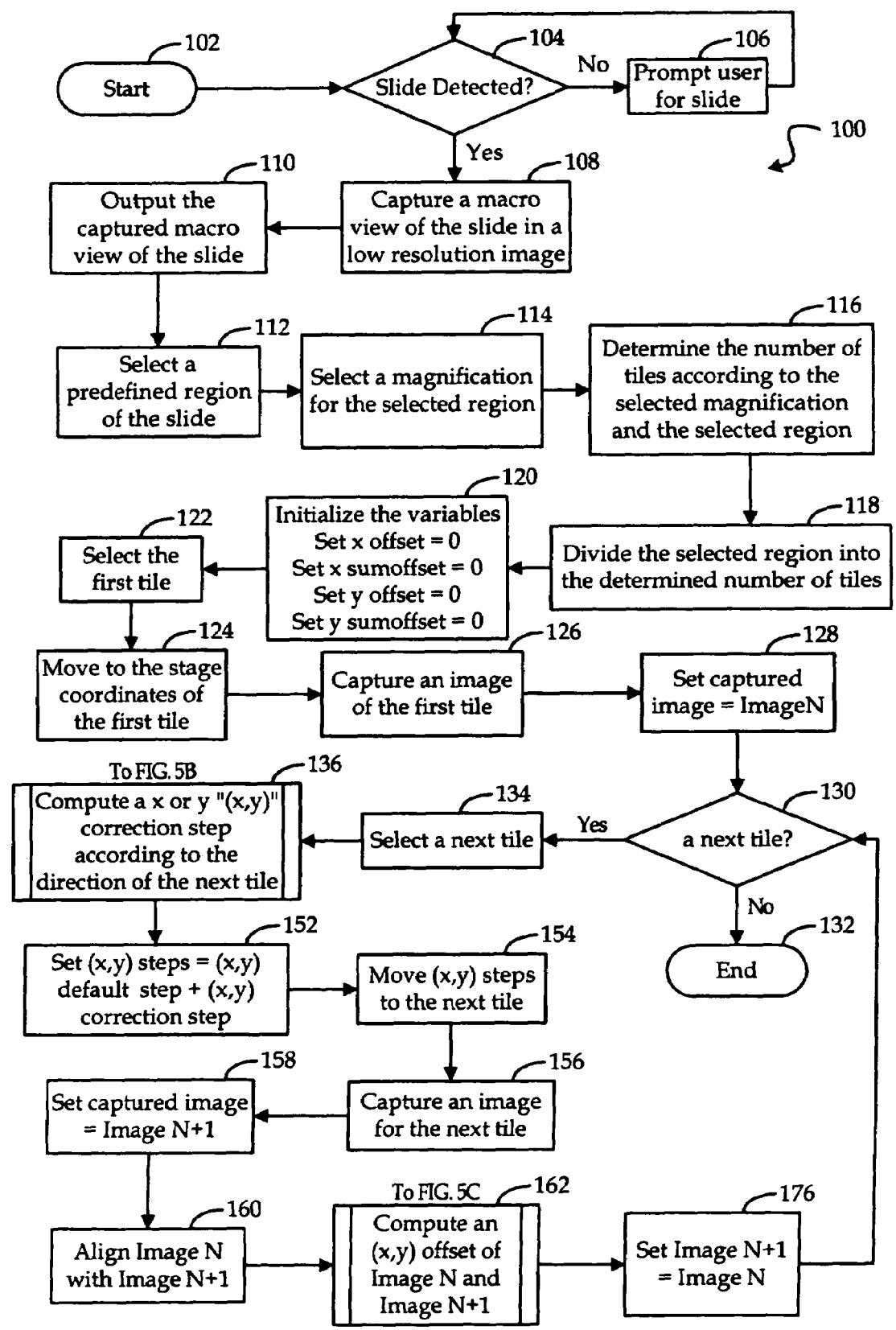
FIGS. 5A, 5B, and 5C are a flow chart diagram of a process according to one embodiment of the present invention.

FIG. 5A shows a flow chart diagram of a process for capturing a selected region according to one embodiment of the invention, which is indicated generally at 100. The process either starts (block 102) automatically from a detection of a slide or manually from a user executing the process. Other implementations to initiate the process are possible, and they are readily appreciated by a skilled artisan. Once the process has been initiated (block 102), it is determine whether a slide has been detected in device (block 104). If not (block 104), the process prompts the user for a slide to be inserted into the device (block 106), which goes back to check for a slide detection again (block 104). Once a slide has been detected (block 104), a macro view of the slide is captured in a low resolution image (block 108), which is outputted to the user on a display (block 110). In one embodiment, the macro capture of the slide includes two macro images at 0.22× magnification, which is aligned and pasted together end-to-end to generate the macro capture of the entire slide. However, other implementations are possible, such as capturing a single field image. The specific implementation depends upon the capability of the device.

The user, using the macro view of the slide, can then select a predefined region of the slide (block 112) and request a capture at a selected magnification of the selected region (block 114). Given the information of the selected region and magnification, the process next determines an appropriate number of tiles to divide the selected region (block 116). The selected region is accordingly divided by the determined number of tiles (block 118). As noted, with a higher magnification, the number of tiles increases, and vice versa. The number of tiles that should be used greatly depends upon the capacity and configuration of the device and the shape of the selected region. Once the selected region has been divided into the determined number of the tiles (block 118), some variables of the system are initialized, specifically an offset value and a sumoffset value are set to zero (block 120).

The first tile is selected (block 122), and the device accordingly moves to the stage coordinates of the first tile (block 124) and captures an image of the first tile (block 126). The captured image of the first tile is set as ImageN (block 128). It is next determine whether there is a next tile (block 130). If not (block 130), which means that all tiles have been accounted for, the process ends (block 132). If, however, there is another tile (block 130), this next tile is selected (block 134). The process determines the movement direction based on the next tile. For example, if the next tile is to the right direction (i.e., positive) of the x axis, the movement would be a right movement on the x axis. Similarly, if the next tile is the downward side (negative) of the y axis, the movement would be a bottom movement on the y axis. In embodiments of the present invention, since the first tile is preferably selected as the first tile image, there would be a right movement, a left movement, and a bottom movement, which are all determined by the direction of the next tile. As a result, depending upon the directional movement to the next tile, an x or y, also referenced as (x,y), offset value would be calculated. These various embodiments are readily appreciated by one skilled in the art, and they are within the scope of the present invention. With the next tile defining an offset value either on the x or y axis (x,y), an (x,y) correction step value is computed (block 136), which initializes the subroutine shown in FIG. 5B.

Figure 5B:
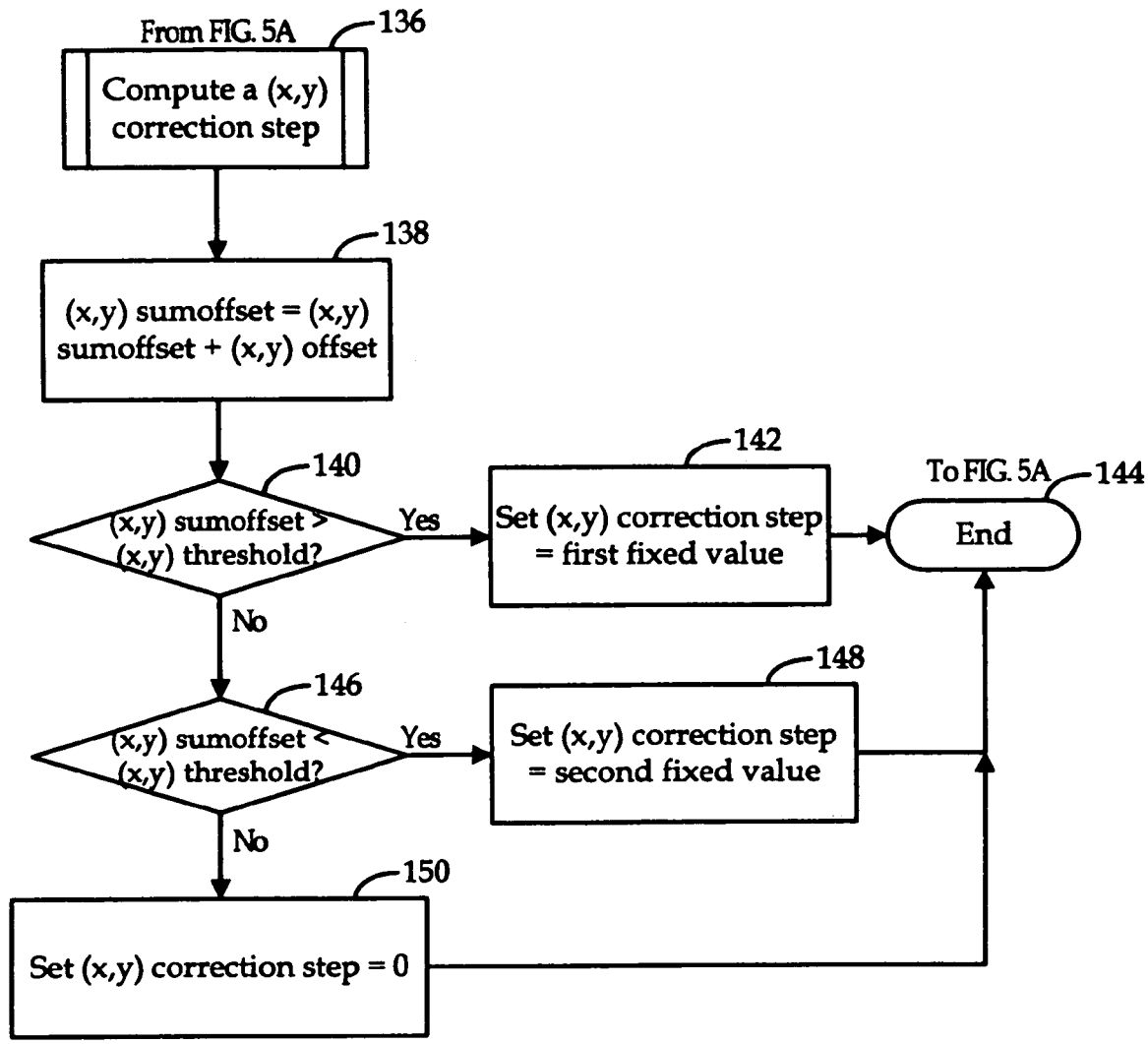

Turning to FIG. 5B, a flow chart diagram of a process for computing a (x,y) correction step value 136 is shown. A new (x,y) sumoffset is set to current (x,y) sumoffset plus (x,y) offset (i.e., (x,y) sumoffset=(x,y) sumoffset+(x,y) offset) (block 138). As noted, because the next tile defines the direction of the alignment, the values are x sumoffset, y sumoffset, x offset, or y offset, and these values are different from one another. However, for clarity and readability of application, the notation (x,y) is used to represent a x or y value. For the first iteration, everything would be zero because these variables were set to zero. However, once the first and second tile images have been aligned, there would mostly likely be a positive or negative (x,y) offset value, which is accounted for on the next iteration.

The (x,y) sumoffset value is next compared to an (x,y) threshold value. Specifically, the process determines whether the (x,y) sumoffset value is greater than the (x,y) threshold value (block 140). If yes (block 140), the (x,y) sumoffset value exceeds the threshold value on the positive side, and in response, the (x,y) correction step value is set to equal to a first predefined value (block 142), which completes the process (block 144). Otherwise, when the (x,y) sumoffset value is not greater than the (x,y) threshold value (block 140), the process next determines whether the (x,y) sumoffset value is less than the (x,y) threshold value (block 146). If so (block 146), which means the alignment was off on the negative side, the (x,y) correction step is set to a second predefined value (block 148), which again ends the process (block 144). In this preferred embodiment, the sampling portions and variables (x,y) sumoffset and (x,y) offset are based on a pixel value of the images and are thus in units of length (μm) expressed as the number of pixels. Thus, the (x,y) threshold value has to be converted to stage steps in units of length (μm), which can be derived by using the relationships expressed in FIG. 6A and FIG. 6B to obtain the first fixed value (block 142) and second fixed value (block 148). These values are in stage steps and are different depending on the magnification used in the image capture. In embodiments of the invention, the first and second predefined value are the same value, except one being a positive value and the other being a negative value. This is to compensate either the stage device went under (e.g., a positive value to correct the offset) or over (e.g., a negative value to correct the offset). However, other values or ranges of values can be used depending on the implementation design and/or the specification of the device. These various implementations are readily recognized by those skilled in the art, and thus they are within the scope of the present invention. If the (x,y) sumoffset value is neither greater or less than the threshold, meaning the offset is within the range of the threshold value and no compensation is needed, the (x,y) correction step value is set to zero (block 150). At this point, the process ends (block 144) since a (x,y) correction step value has been obtained, and the process goes back to FIG. 5A.

Referring back to FIG. 5A, the (x,y) steps is set to a (x,y) default step, which is predefined, plus the (x,y) correction step value obtained in FIG. 5B (block 152). The process moves the stage (x,y) steps to the next tile (block 154) and captures an image (block 156). The captured image is then set as Image N+1 (block 158), and Image N and Image N+1 are aligned (block 160). From the result of the alignment, a (x,y) offset value of Image N and Image N+1 is computed (block 162), which initiates the subroutine shown in FIG. 5C.

Figure 5C:
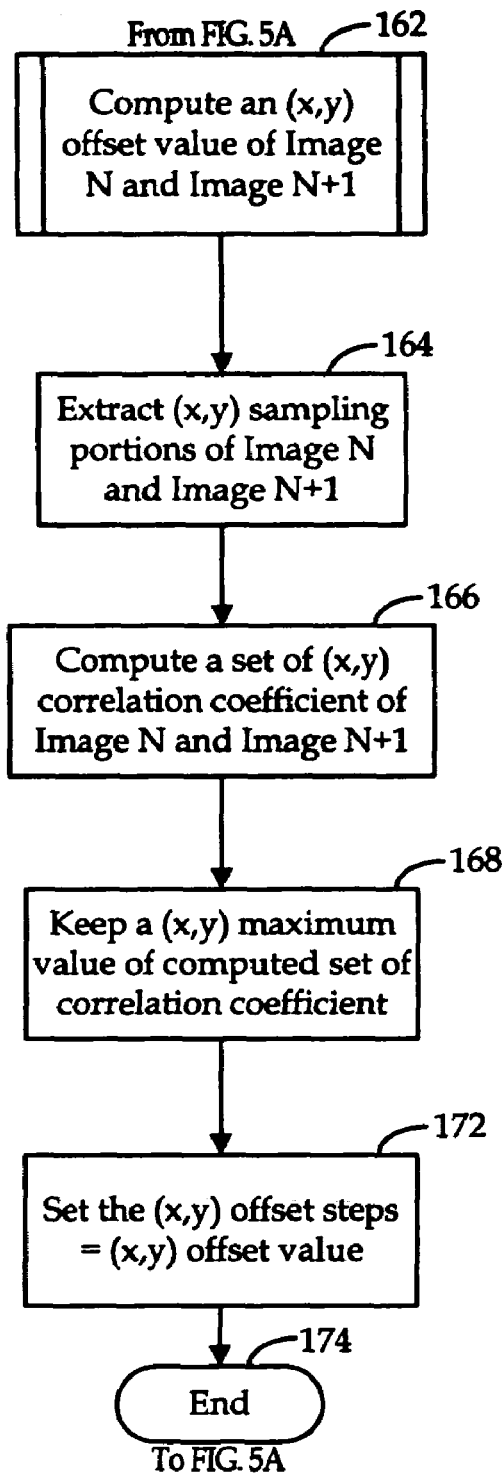

Turning now to FIG. 5C, a flow chart diagram of the process for computing the (x,y) offset value of Image N and Image N+1 is computed 162, which starts by extracting sampling portions of both images (block 164). A set of correlation coefficient of image N and image N+1 (block 166) is calculated based on the extracted sampling portions (block 166), and a maximum value from the set of the correlation coefficient will be retained (block 168) along with the (x,y) offset steps associated with the maximum value. Again, whether the offset value is an x or y value is based on the direction of the next tile. As a result, the extracted sampling portions are also according to whether the next tile is to the x or y axis. Moreover, in embodiments of the invention, each extracted sampling portion is hashed, and only the maximum is kept for each iteration of the sampling portions. In this preferred embodiment, the sampling portions are based on a pixel value of the images and the (x,y) offset steps are in numbers of pixels, i.e., the number of pixels required to move one image relative to the other image so that they will line up exactly in either the x or y direction. After the offset steps are obtained, it is set as the (x,y) offset value (block 172), and the process ends (block 174) and loops back to the process in FIG. 5A. In an alternative embodiment of the invention the sum of the absolute differences between the image pixel values of the sampling portions may used instead of the correlation coefficient. In this case the minimum absolute difference is kept for each iteration of the sampling portions along with the (x,y) offset steps associated with the minimum value.

Referring again to FIG. 5A, with the new (x,y) offset value being set, the image N+1 can now be set to image N (block 176). The process loops back to check if there is another next tile (block 130). If so (block 132), the process performs another iteration for the next tile by selecting the next tile (block 134). Otherwise, the process ends (block 132) because all the tiles are been scanned and captured through the process. In embodiments of invention, the captured images are preferably aligned again, which is similarly to the process shown in FIGS. 5A, 5B, and 5C, except that the tile does not have to be captured. However, the calculation of the offset value and the movement based on this calculated offset value remains the same.

For a given magnification and image size and the number of nominal x, y incremental steps to move the stage for each acquisition can be computed. By way of example, FIGS. 6A and 6B respectively show the pixel values of an associated image sensor and an inexpensive stage with low resolution incremental steps. Specifically, in FIG. 6A, the pixel size at the sensor face of a 5 megapixel ⅔ inch digital sensor of 6.75 μm in width and 6.75 μm in height is indicated, with the corresponding size in the specimen plane for a 10×, 20×, and 40× magnification. For example, as indicated in FIG. 6A, the pixel size in the specimen plane of a single pixel at 20× magnification is 0.34375. The image size in width and height at the specified magnification for an image tile of a specified number of pixels can be easily calculated based on the size of the single pixel.

FIG. 6B also shows the number of stage steps for a 1.25 μm incremental positioning stage platform. The stage steps are truncated to the nearest integer value in the cases where an exact number of steps does not cover the distance specified. For example, the image width of 103.4 μm at 40× magnification would require 103.4 stage steps, which is truncated to 103 steps, causing a an alignment problem of approximately 2 pixels. The lower cost stages without optical encoder feedback control tend to result in errors of alignment.

Figure 7A:
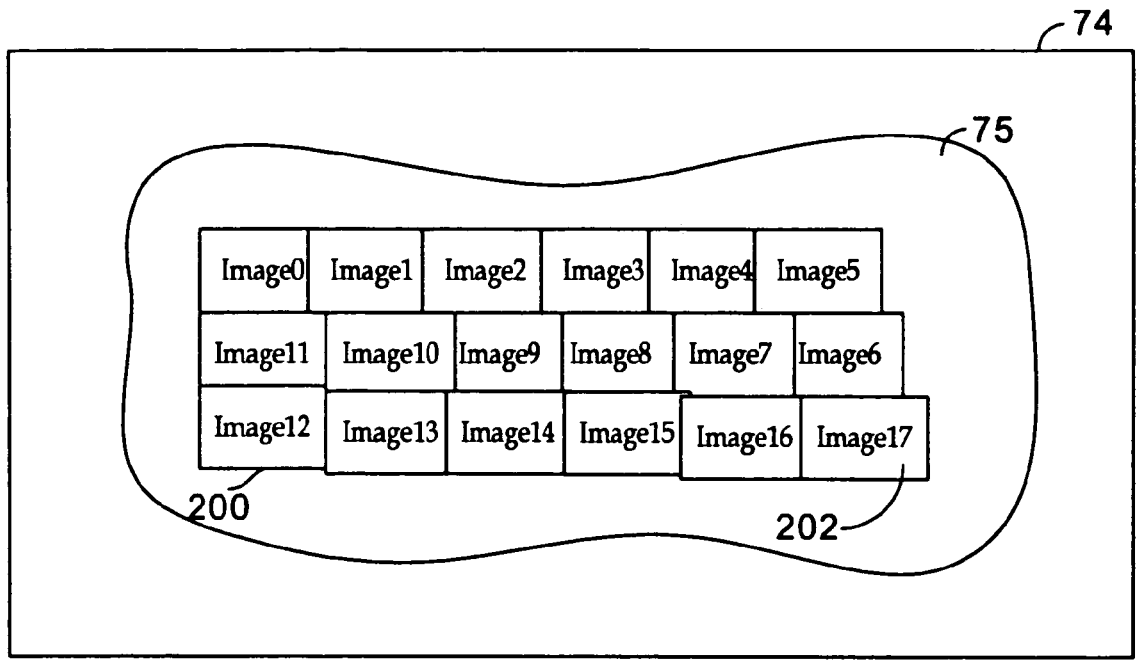
FIGS. 7A, 7B and 7C illustrate exemplary diagrams of multiple tile image and alignment of these tile images according to one embodiment of the invention.

FIG. 7A illustrates an exemplary pattern of image tiled acquisition using a 5 megapixel image sensor, where each tile is a full 1280 by 960 pixel size. A selected area 200 of the specimen 75 is divided into multiple tile images 202. In this example, the selected area 200 is divided from tile Image0 through Image17. The tile images 202 generally have large overlaps between them to ensure the whole image of the selected area 200 is correctly captured during alignment.

Figure 7B:
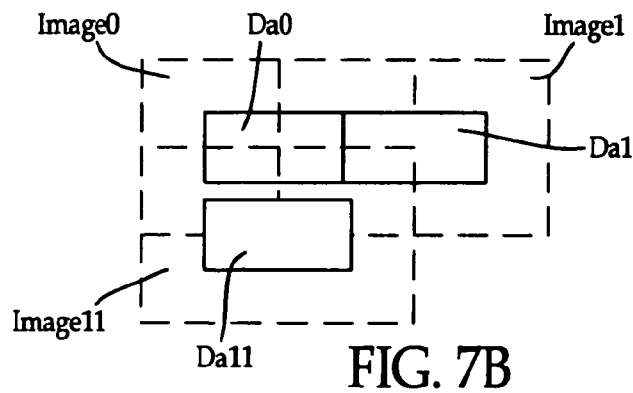
Figure 7C:
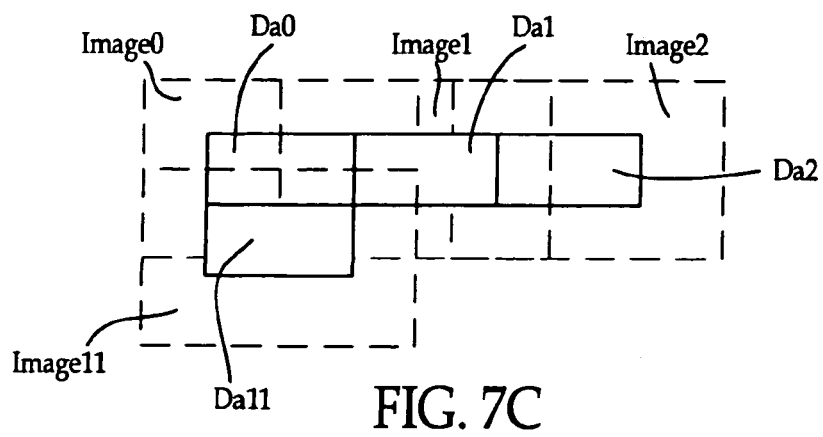

FIGS. 7B and 7C illustrate an exemplary alignment of extracted portions of Image0, Image1, Image2, and Image11 shown in FIG. 7A. If the center of each image is chosen as a tile, overlapping regions of images are thus available outside of the center region for subsequent alignment and extraction of the nominally centered portions after (x,y) offset correction. As shown in FIG. 7B, the centers Da0 and Da1 of Image0 and Image1 overlap in the x direction, and the center Da11 of tile Image11 is gapped and not correctly aligned with Image0 and Image1. This is based on the assumption that the exact centers are located assuming precise stage motions. Since the stage motions are imprecise, extraction of the center portions as tiled virtual slide captures would result in misalignment and discontinuities of the virtual slide image. After alignment by using the (x,y) offsets, as shown in FIG. 7C the centers of Da0 and Da11 of Image0 and Image11 are aligned with no overlapping regions since they are extracted from different portions of the largely overlapping Image0, Image1 and Image11. Because of the scanning pattern Y errors tend to happen to a complete row, which has a tendency to be erratic for short distances, the scanning pattern Y errors exhibits a rolling cyclical pattern for longer distances. Extracting center portions of very largely overlapping initial images is an important aspect of the invention, since it is not feasible to cross correlate the image in the case of non-overlapped gaps due to overshoot of the stage motion. With largely overlapping images, after correlation, a tile is simply taken out of a different region of the image if there is either an overlap or gap due to undershooting or overshooting of stage motion.

In one embodiment of the present invention, the procedure to match up two images with overlapping regions, and the two images are referred to as the Alpha image and the Delta image. The procedure is conceptualized as keeping the Alpha image region fixed and moving the Delta image region over the Alpha image region in a raster scan pattern and computing a parameter, for example the minimum absolute difference between the regions by subtracting each pixel while iterating the delta region over the alpha region in x and y and over a fixed search range. Thus, the Delta region indexes stay the same and the Alpha region indexes change through the search procedure to compare different regions to the fixed Alpha region. The Alpha image regions and Delta image regions are defined by x and y start and end coordinates that define the regions that should be identical if there were no errors in positioning between the two images. The output are the X and Y offsets of the determined mispositioned images. The regions should be chosen so that moving the coordinates on the Alpha image region by the search range does not move the compared region on the Alpha image region off the larger original images.

Figure 8A:
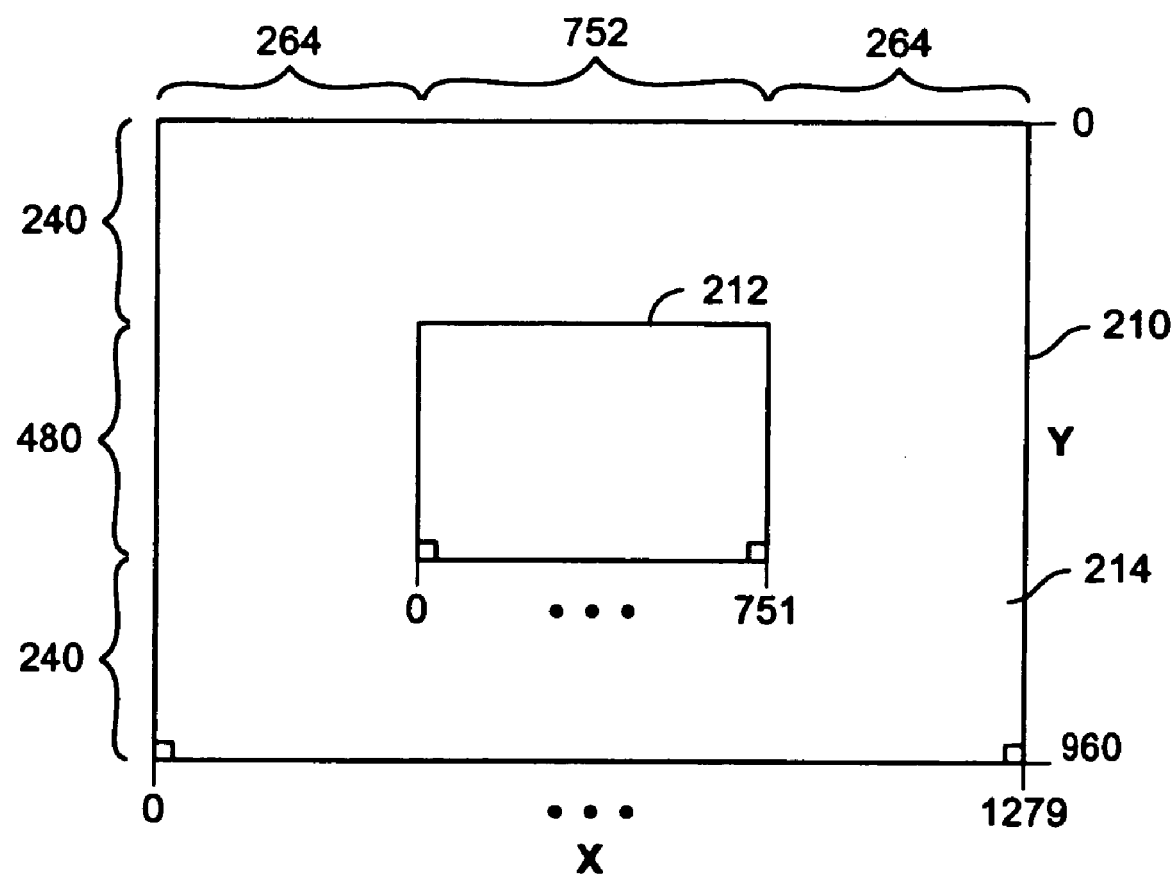
FIGS. 8A, 8B, 8C, and 8D illustrates exemplary pixel values of the alignment movements of the tile images shown in FIG. 7A.

FIG. 8A shows an exemplary dimension of a first tile Image0, 210 shown in FIG. 7A. The microscope 12 uses the stage coordinates to move the nominal stage steps associated with 752 pixels in the x direction and 480 pixels in the y direction to capture each larger 1280 by 960 image. As shown, the tile Image0 210 includes the center tile area Da0 212 and an extra captured area 214 adjacent to the center tile area. The complete area of the captured larger image 210 measures 1280 pixels across the x axis and 960 pixels across the y axis. However, the center area 212 measures 752 pixels on the x axis and 480 pixels on the y axis, and the remaining areas consists of the extra captured area 214, which measures 264 and 240 pixels on both sides of the tile at the x and y axis, respectively. Of course, these indicated measurements are only exemplary, because they vary with different captured resolutions of the microscope 12. Other alternative measurements and ratios are contemplated, and they are within the scope of the present invention. The larger image captured by the microscope 12 includes the tile along with the extra area adjacent to the tile.

Figure 8B:
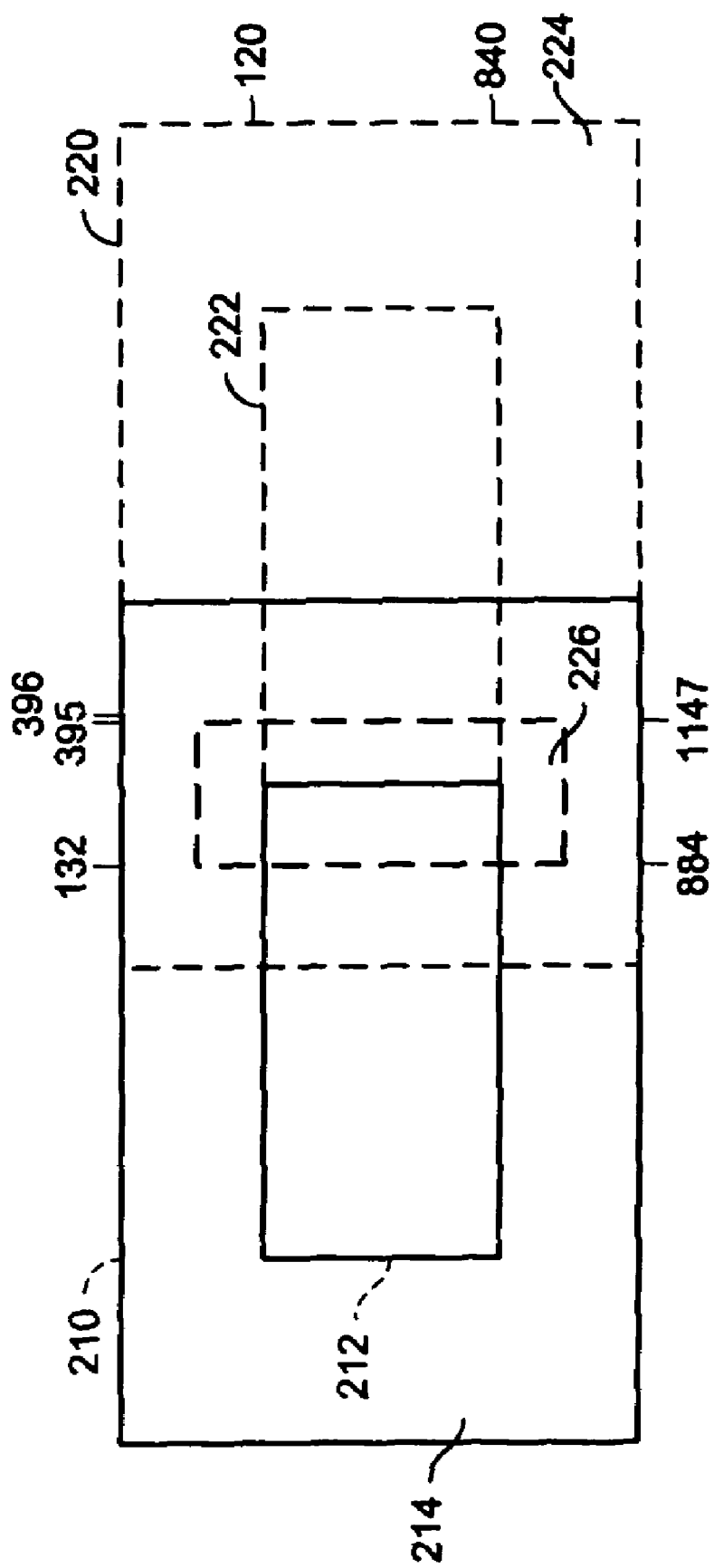

FIG. 8B shows an exemplary dimension of the second tile Image1 220 that is captured to the right of tile Image0 210 shown in FIG. 8A on the x axis. In this embodiment, once the first tile image0 210 is captured, the microscope 12 is instructed to move right according to a predefined step to capture the second tile image 220, which includes its corresponding second center area Da1 222 and second extra captured area 224 adjacent to the tile area. In this example, the predefined step is defined by a distance of 752 pixels to the right of the first tile image0 210. In particular, the first center area Da0 212 of the first tile Image0 210 overlaps the second center area Da1 222 of the second tile Image1 220 to ensure that the captured tile is larger than the divided tile. The overlapping areas ensure that the whole area of the tile is captured, and as a result, no areas of the tiles are lost due to the inaccurate movement of the microscope 12. Moreover, these extra areas are useful during the alignment process for accuracy. In this instance the area of correlation used is an overlapping area 226 between the two larger images. In the x direction this starts with the 132nd pixel and ends with the 395th pixel of the right image 211 (shown at the top). Similarly, the overlapping area of the left image 210 is between the 884th pixel and the 1147th pixel (shown at the bottom). The remaining tile Image2 through Image5 located on the right of Image0 on the x axis would be similarly overlapped according to the offset value in the x direction.

Figure 8C:
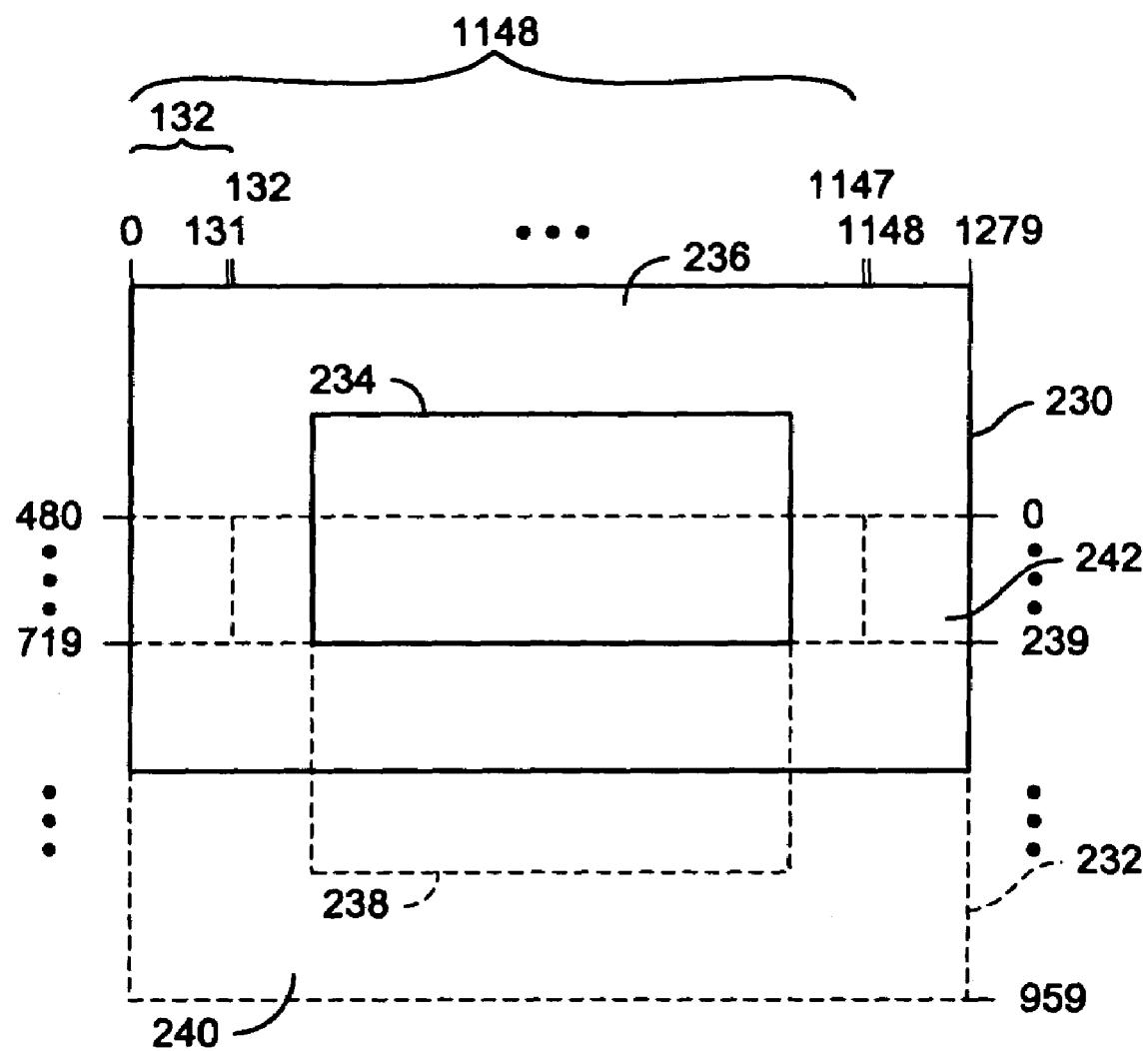

FIG. 8C shows an exemplary dimension of tile Image5 230 and tile Image6 232, which is captured as a bottom movement from the tile Image5. In this example, after all the tile images have been captured through moving right on the x axis, the microscope 12 is instructed to move down on the y axis to capture the next tile image (e.g., Image6 232) from the last tile image (e.g., Image5 230) captured on the right of the x axis. In this example, the microscope 12 moves approximately 480 pixels equivalent stage steps downward from the tile Image5 230, which similarly includes a center area Da5 234 and an extra captured area 236, to capture tile image6 120, which also includes its corresponding center area Da6 238 and an extra captured area 240. An overlapping area is created between the two larger images. Again, with the two tile images on the top and bottom being captured, an overlapping area is guaranteed to ensure that no areas of the tile are lost due to the inaccurate movements of the microscope 12. Moreover, an offset value in the y direction is also calculate for tile Image5 and Image6. The area 242 is used to calculate this offset value. This is between the 480th pixel and the 719th pixel of tile Image5 230 (shown on the left) and between the zero (0) pixel and the 239th pixel of tile Image6 232. The overlapping area shown is measured about 239 pixels in distance, which is approximately the top of the extra captured area 240 of the tile Image6 232. In this embodiment, since the next tile image after the tile Image6 is the left side of the x direction, the microscope will accordingly be moved to the left of the x axis to capture the next tile image, which is tile Image7.

Figure 8D:
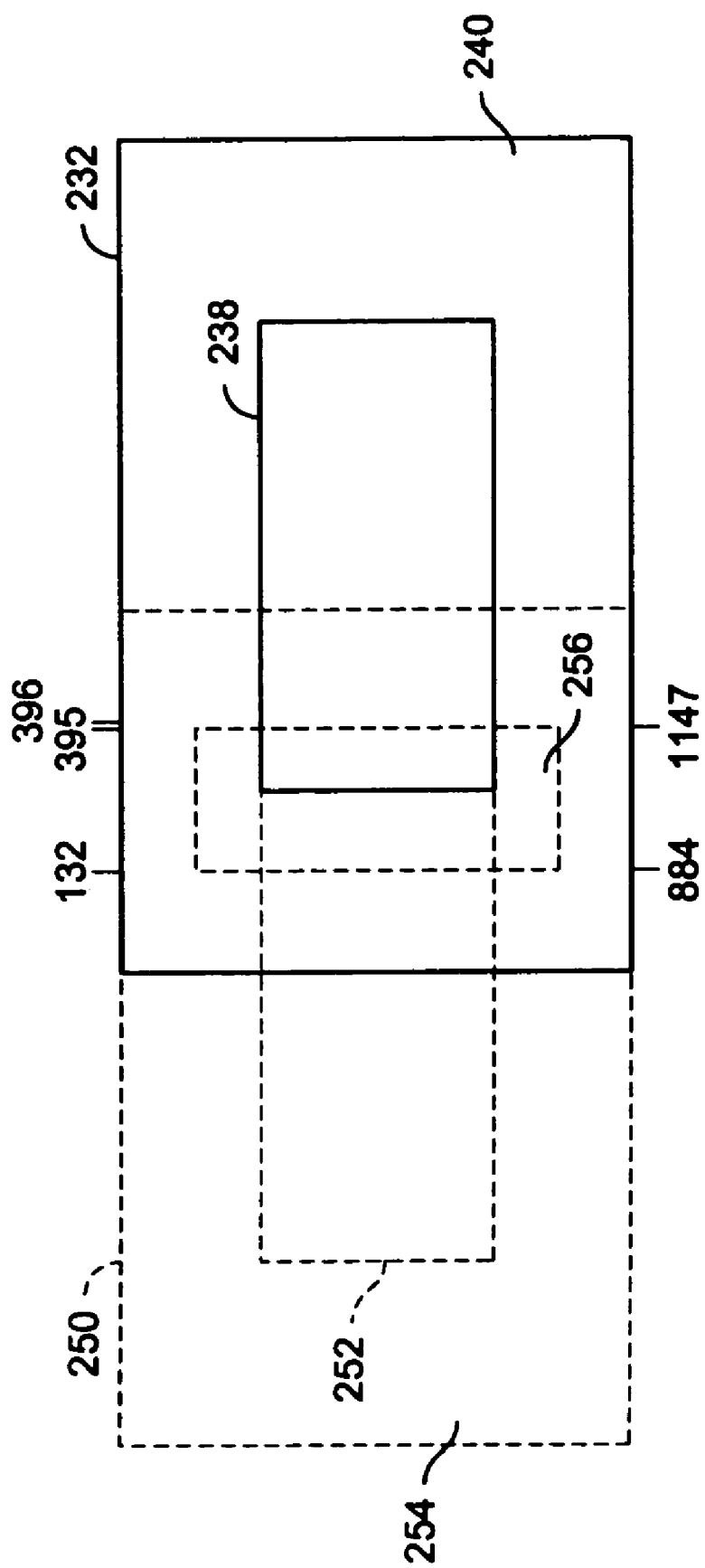

FIG. 8D shows an exemplary dimension of tile Image6 232 and tile Image7 250, which is captured as a left movement from the tile Image6. In this example, the microscope 12 is instructed to move left on the x axis to capture the next tile image (e.g., Image7 250) from the last tile image (e.g., Image6 232) captured on the y axis. In this case, the tile Image7 is the first tile image of the bottom movement on the y axis, and at the same time the first tile image on the left movement of the x axis. In this example, to capture the tile image7, the microscope 12 moves from the stage coordinates of the tile image6 to a stage step distance, which is based on the previous offset value in the x direction, to the left of the x axis. The tile image7 similarly includes a center area 252 and a extra captured area 254. An overlapping area 256 is used for calculating the x offset value is between the 132nd pixel and the 395th pixel of the first tile image (shown at the top). The remaining images Image8 through Image11 located on the left of Image7 on the x axis would be similarly overlapped according to offset values calculated dynamically throughout the process. Upon the completion of image11, the process moves down (e.g., bottom movement in the y axis) to capture tile Image 12 as shown in FIG. 8C. After which, tile Image13 through Image17 are captured along the right direction on the x axis as shown in FIG. 8B, which completes the capture process for the selected image. FIGS. 8A, 8B, 8C, and 8D are shown as a solid example, as stated, and the measurements, the number of field images used for each tile, the predefined distance, and the direction of the movements can be altered. For example, the microscope 12 can be moved along both the x (left or right) and y axis (up and down). All these parameters can be set according to the desired benefits of speed or accuracy. As a result, these multiple alternative implementations are within the scope of the present invention.

The above descriptions of FIGS. 8A, 8B, 8C, and 8D illustrate in detail the calculation of the alignment of images needed for final tile extraction. Another associated problem illustrated and described in relation to FIGS. 5A, 5B, and 5C is to make sure that the error of positioning with a fixed step size of moving the stage is not so large that after correlation there is not enough region left in the large image to cut out the smaller tile. This is solved by the other aspect of the invention, to vary the step size by feedback control based on the results of the cross-correlation of the images as shown in FIGS. 5A, 5B, and 5C. As described more fully above this was accomplished by choosing an ideal x,y set point for center tile extraction and varying the step size of the next step based on the previous error in alignment. If the surrounding area of image alignment is relatively large, this will tend to keep the subsequent image positioned so that the tile is contained in that image. Thus the large image overlap and correlation between regions shown in FIGS. 8A, 8B, 8C, and 8D is used for both purposes. In the present embodiment after the first images Image0, Image1, etc. are saved using the feedback information to insure sufficient overlap, a second identical to the first, but on the saved images is implemented wherein the correlation is with the saved images and the final extracted Da0, Da1, etc tiles are extracted and saved as a virtual slide data structure. The original large images are then discarded.

Figure 9A:
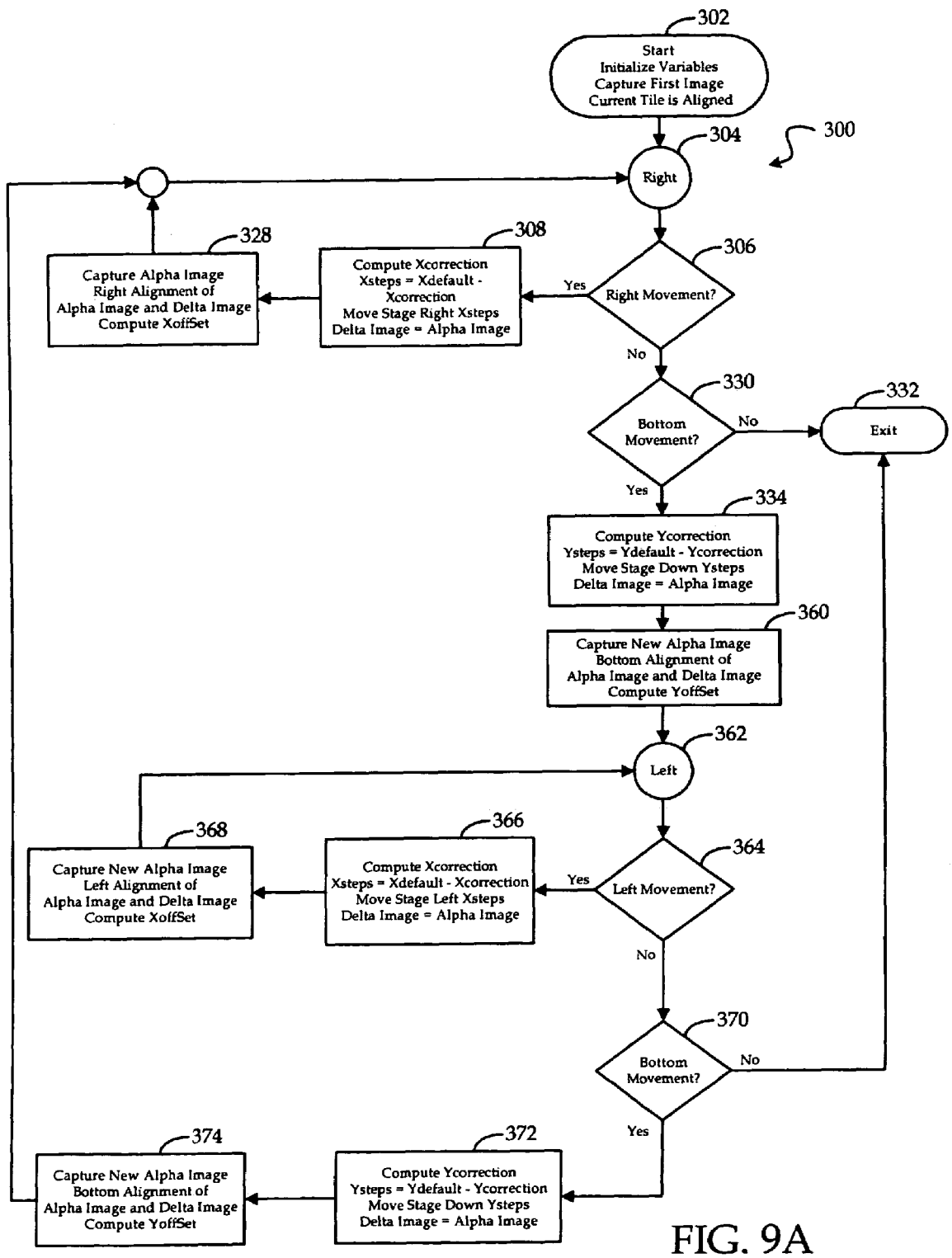
FIGS. 9A, 9B, 9C, and 9D are flow chart diagrams illustrating processes according to one embodiment of the invention.

FIG. 9A shows a flow chart diagram of an extraction process for capturing the images according to a more specific embodiment of the invention using a stage step of 1.25 um, which is indicated generally at 300. The process starts by initializing the variables (block 302). Specifically, an Xoffset value, Yoffset value, SumXoffset value, and SumYoffset value are all set to zero. Moreover, during initialization, the first tile image is captured (block 302). In this embodiment, the next tile image from the first tile image is preferably on the right (block 304). As a result, the process first determines whether there is a tile along the right direction of the x axis, which creates a right movement (block 306). If so, a Xcorrection value is computed, which is show in FIG. 9B.

Figure 9B:
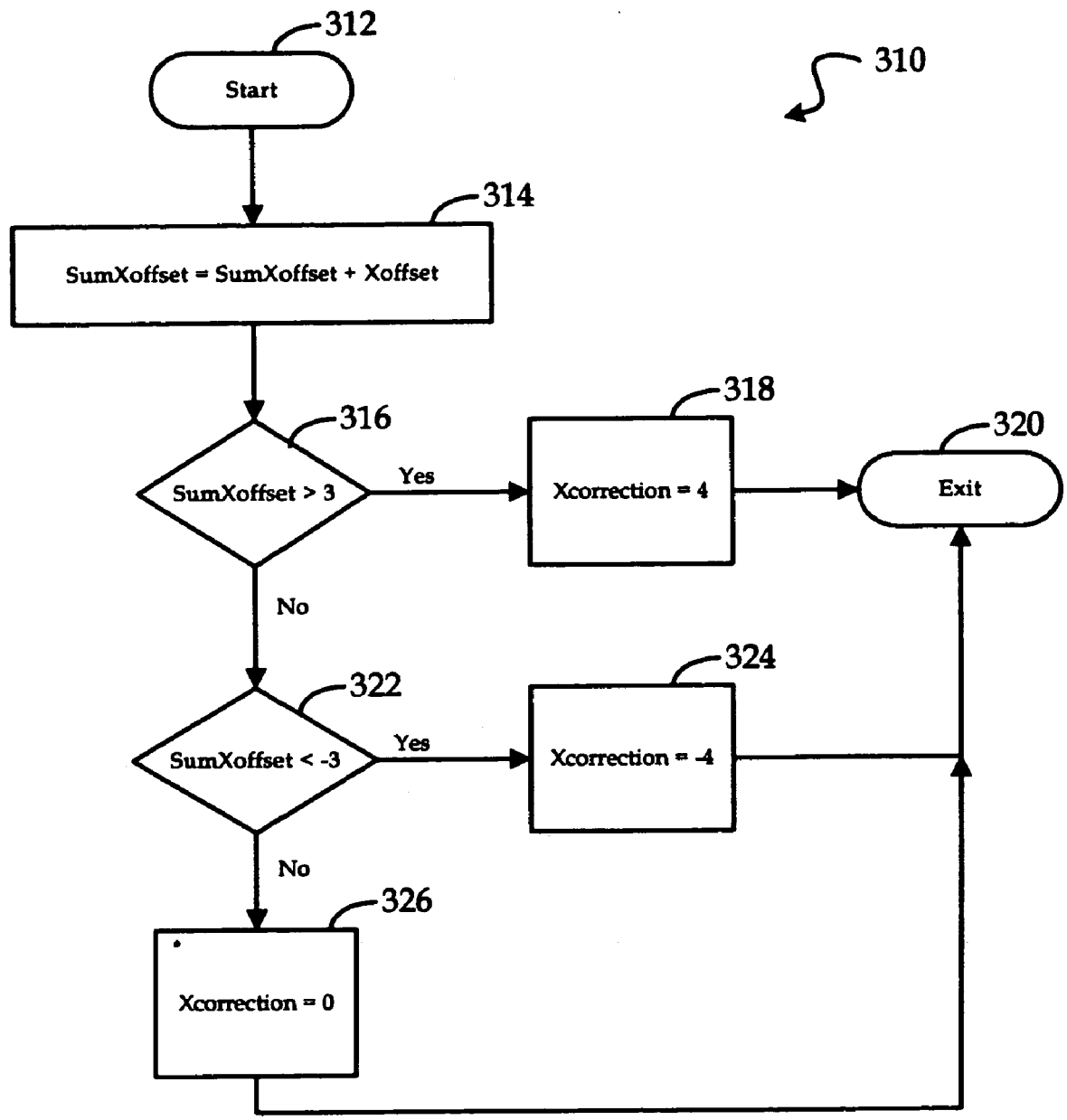

Turning to FIG. 9B, a flow chart diagram for computing the Xcorrection value is shown and indicated generally at 310. This process starts (block 312) by setting the SumXoffset to equal SumXoffset+Xoffset (block 314). From the initialization in FIG. 9A, the first iteration of this process would be SumXoffset=0+0. It is then determined whether SumXoffset is greater than a Xthreshold value of 3 (block 316). If the SumXoffset is greater than the Xthreshold value 3 (block 316), which means the offset value of the aligned images needs to be compensated on the positive direction (e.g., right side) of the x axis, a Xcorrection is set to a value of 4 (block 318), which would moves the stage 4 pixel steps over from the default steps. For this specific embodiment, a Xthreshold value of 3 and Xcorrection value of 4 are used for the inexpensive stage using a 1.25 um stage step. However, other Xthreshold value and Xcorrection value can be used depending on the specification of the stage device, which is readily appreciated by one skilled in the art. After the Xcorrection value is set, the process ends and goes back to FIG. 9A (block 320).

If, however, the SumXoffset is not greater than the Xthreshold value (block 316), the process continues checking and determines whether the SumXoffset is less than the negative Xthreshold value of −3 (block 322). If so, the offset value of the aligned images needs to be compensated on the negative direction (e.g., left side) of the x axis. And the Xcorrection is set to −4 (block 324), which again ends the process (block 320) since a Xcorrection value has been obtained. Otherwise, when the SumXoffset is not less than Xthreshold value of −3 (block 322), the Xcorrection is set to zero because no correction is needed (block 326). The process again is completed since a Xcorrection value is obtained, which bring the process back to FIG. 9A. Again, with the Xcorrection value on the left side, multiple different values can be used for the negative Xthreshold and the Xcorrection depending the specification of the stage device. These alternative embodiments are readily appreciated by one skilled in the art, and thus they are within the scope of the present invention.

Turning back to FIG. 9A, after the Xcorrection value is computed, a Xsteps value is set to Xdefault minus Xcorrection (block 308). The stage moves right based this Xsteps (block 308) and captures the image (block 328). The captured image is then set to the delta image for a right alignment with the alpha image of the previous image (block 328). Accordingly, a Xoffset is computed based on the results of the right alignment between the delta and alpha images (block 328). The process loops back to check whether there are any more right movements (block 306). If there are tiles left in the right direction on the x axis (block 306), the process goes back to computing a new Xcorrection with the new Xoffset value (block 306).

Otherwise, when there is no more right movement (block 306), the process determines whether there is a bottom movement for a next tile (block 330). In other words, the process checks whether there is a next tile down from the last tile that was captured on the right direction of the x axis. If not, which means all the tiles have been accounted for, the process ends (block 332). If, however, there are more tiles that would require a bottom movement, a Ycorrection value is computed (block 334), which is shown as a subroutine in FIG. 9C.

Figure 9C:
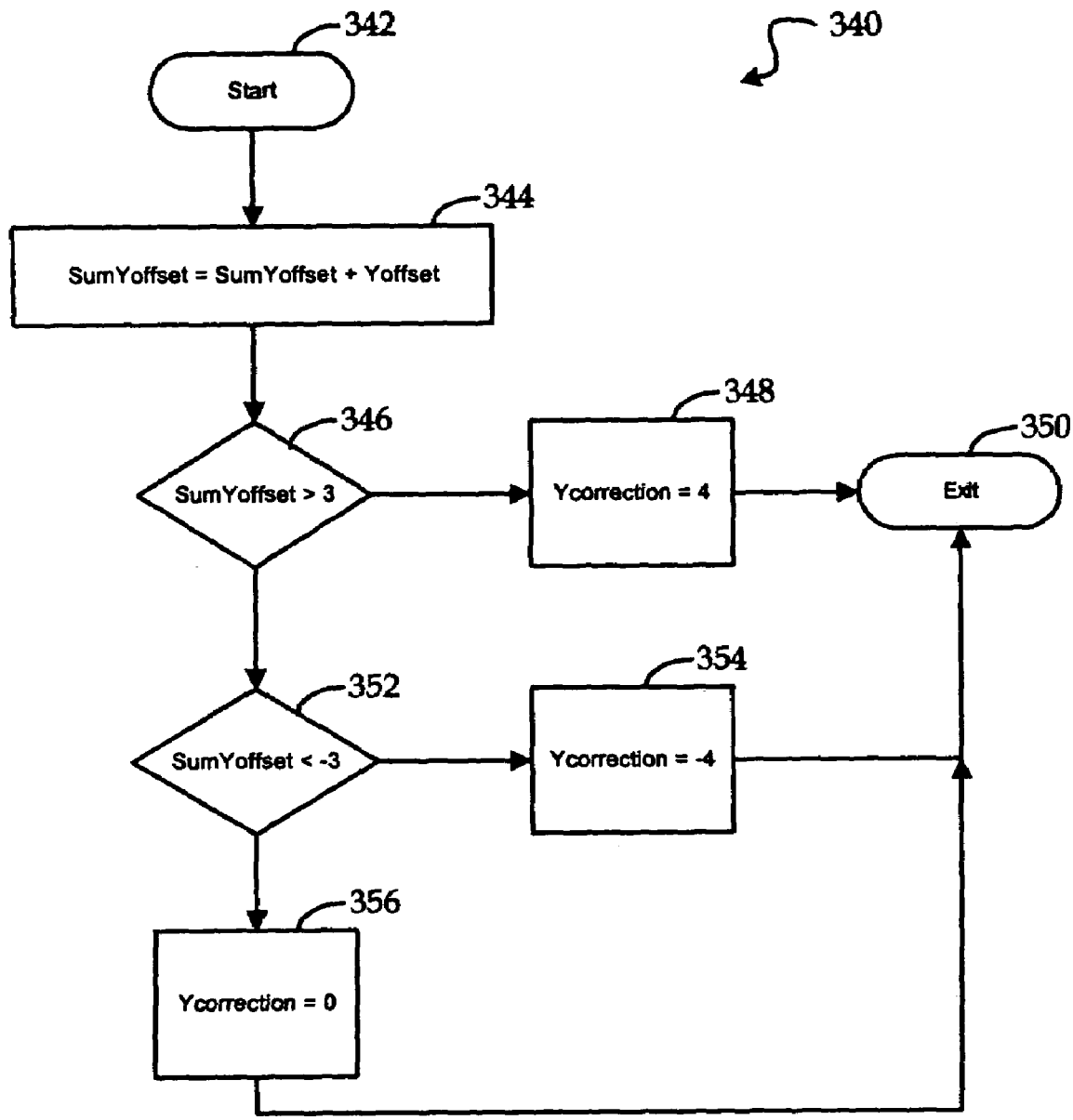

Turning now to FIG. 9C, a flow chart diagram for computing the Ycorrection value is shown and indicated generally at 340. Similar to the Xcorrection process shown in FIG. 9B, the process starts (block 342) by setting the SumYoffset to equal SumYoffset+Yoffset (block 344). Since these variables were initialized in FIG. 9A, the first iteration of this process would be also be SumYoffset=0+0. However, the iteration thereafter will have SumYoffset value according to any offsets found during the alignment of the images. The process next determines whether SumYoffset is greater than a Ythreshold value of 4 (block 346). If the SumYoffset is greater than the Ythreshold value 3 (block 346), which means the offset value of the aligned images needs to be compensated on the positive direction (e.g., upward) of the y axis, a Ycorrection is set to a value of 4 (block 348), which would moves the stage 4 pixel steps down from the default steps. According to this specific embodiment using an inexpensive stage with a 1.25 um stage step, a Ythreshold value of 3 and Ycorrection value of 4 are used. However, similar to the Xcorrection process shown in FIG. 9B, the Ythreshold value and Ycorrection value may be different depending on the specification of the stage device, which is readily appreciated by one skilled in the art. After the Ycorrection value is set, the process ends and goes back to FIG. 9A (block 350).

On the other hand, if the SumYoffset is not greater than the Ythreshold value (block 346), the process continues by determining whether the SumYoffset is less than the negative Ythreshold value of −3 (block 352). If so, the offset value of the aligned images needs to be compensated on the negative direction (e.g., downward) of the y axis. The Ycorrection is accordingly set to −4 (block 354) to compensate 4 steps downward on the y axis. The process again ends at this point (block 350) since a Ycorrection value has been obtained. Otherwise, when the SumYoffset is not less than negative Ythreshold value of −3 (block 352), the Ycorrection is set to zero because no correction is needed (block 356). The process again is completed (block 350) since a Ycorrection value is obtained, which bring the process back to FIG. 9A. Again, multiple different values can be used for the Ythreshold and Xcorrection value depending the specification of the stage device. These alternative embodiments are readily appreciated by one skilled in the art, and thus they are within the scope of the present invention.

Referring again to FIG. 9A, a Ysteps that equals to a Ydefault value minus the computed Ycorrection value is computed (block 334). The stage moves down the Ysteps obtained from the Ydefault value and the Ycorrection value (block 334) and captures an image (block 360). The captured image is set as the delta image (block 360), and the image before this captured image is set as the alpha image (block 334). A bottom alignment of the alpha image and the delta image is done, which would allow for a Yoffset value to be computed (block 360).

After the bottom alignment is performed in the Y direction, the tiles on the left side of the x axis are next captured (block 362). The process accordingly determines whether the stage should move left to capture a tile located left of the previously captured tile (block 364). If so (block 364), the subroutine shown in FIG. 9B will be again executed to compute a Xcorrection for the left movement (block 366). Using the Xcorrection, the Xsteps value is again computed, which is based on the Xcorrection being subtracted from the Xdefault value (block 366). The stage moves left Xsteps (block 366) and captures an image (block 368). The captured image is set as the delta image (block 368) while the previously captured image would be the alpha image (block 366). A left alignment of the alpha and delta images is performed, and another Xoffset value will computed based on the left alignment (block 368). The process loops back to the left movement (block 362) and continues to check more tiles that would require another left movement (block 364).

If no more left movements are required (block 364), the process continues to another bottom movement process, which checks for bottom movement (block 370). If there are more tile downward of the y axis, the Ycorrection value is again computed (block 372) using the subroutine shown in FIG. 9C. After which, the Ysteps is computed using the Ydefault and the Y correction (block 372). The stage moves down on the y axis (block 372) and captures an image (block 374), which is set as the delta image. Again, an alpha image of the previous captured image is aligned with the delta image on the y axis, and another Yoffset value is computed from the results of the bottom alignment (block 374). The process loops back to the right movement (block 304) and determines whether there is a right movement for the next tile (block306). If no bottom movement is required (block 370), the process ends (block 332) because all the tiles have been accounted for and captured.

Figure 9D:
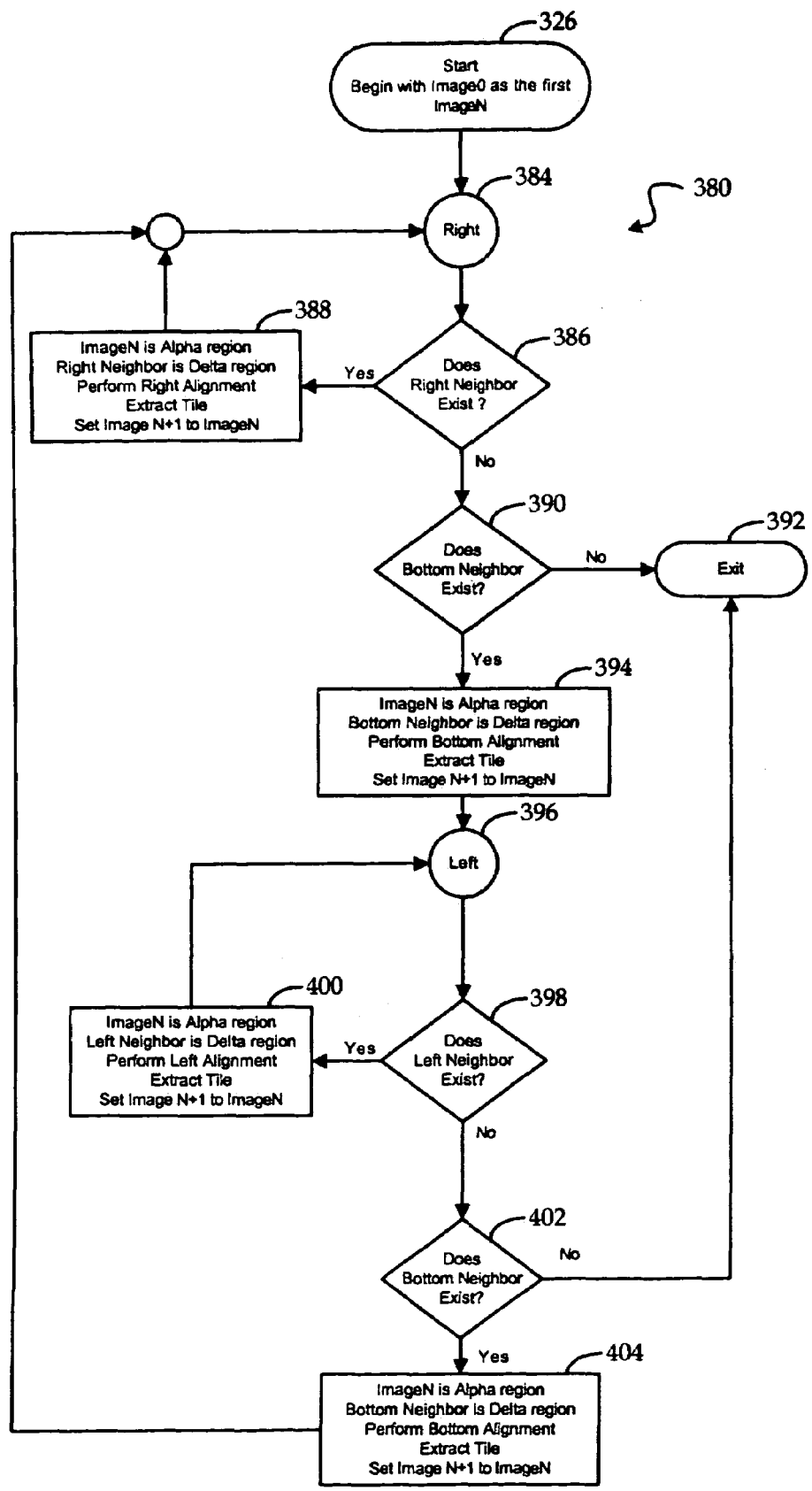

FIG. 9D shows a flow chart diagram of an extraction process for capturing the final nominally centered DA0, Da1, etc. tiles from a series of captured and saved larger images Image0, Image1, etc. With all the images, another alignment process, which is indicated generally at 380, is performed with these captured images from FIGS. 9A, 9B, and 9C. The process starts with Image0 (block 382). The center DA0 tile of Image0 is extracted and saved in the virtual slide data structure. The coordinates of the extracted tile, in Image0 x,y coordinates, starts at x equal to 264, and y equal to 240 as indicated in FIG. 8A. The x,y tile size of the extracted tile is 752 by 480. Moving right (block 384) to a next image of the current image, it is determined whether a right neighbor of the current tile exists (block 386). If so, the current image is set as alpha and the right neighbor of the current tile is set as delta, and a right alignment is performed between the alpha and delta images (block 388). After the right alignment, the center DaN+1 tile of ImageN+1 is extracted and saved in the virtual slide data structure. The coordinates of the extracted tile, in ImageN x,y coordinates, starts at x=264+x offset, and at y=240+y offset. The x,y tile size of the extracted tile is 752 by 480. The delta image N+1 image becomes the current alpha image N (block 388). The process loops back to the right (block 384) and checks right neighbors of the current image (block 386). If there is another right neighbor image (block 386), it continues the alignment of the right neighbor image (block 388) and extracts a tile corrected by it's beginning offset in x and y from the last extracted tile position. If there is no more right neighbor images (block 386), a bottom neighbor is checked (block 390). If no bottom neighbor exists (block 390), the process ends because all the images should have been accounted for (block 392).

On the other hand, if a bottom neighbor does exists, the current image is set as the alpha image and the bottom neighbor image is set as the delta image, and a bottom alignment is performed (block 394) and extracts a tile corrected by it's beginning offset in x and y from the last extracted tile position. The process moves left (block 396) and determines whether there is a left neighbor image (block 398). If so, the current image is set to the alpha image and the left neighbor image is set to the delta image for a left alignment to be performed (block 400) and extracts a tile corrected by it's beginning offset in x and y from the last extracted tile position. The process back to another left movement (block 396). This iteration is performed until a left neighbor no longer exists (block 398), which is followed by a determination of whether there is a bottom neighbor image (block 402). If there is a bottom neighbor image (block 402), the current image and the bottom neighbor are respectively set as alpha and delta, and a bottom alignment is performed for both images (block 404) and extracts a tile corrected by it's beginning offset in x and y from the last extracted tile position. At this point, the process loops back to a right movement (block 384), which checks for a right neighbor exist (block 386). On the other hand, if there is no bottom neighbor (block 402), the process ends (block 392).

While there has been illustrated and described a particular embodiment of the present invention, it will be appreciated that numerous changes and modifications will occur to those skilled in the art, and it is intended in the appended claims to cover all those changes and modifications which followed in the true spirit and scope of the present invention.

What is claimed is:

1. A computer-readable medium having computer-executable instructions for a stage carrying a specimen movable relative to an objective lens to capture image data for a virtual microscope slide comprising:

capturing data for first and second magnified images, the first magnified image having a first central area with a predefined size and being surrounded on all sides by a first capture area, second magnified image having a second central area with the predefined size and being surrounded on all sides by a second capture area, the first and second capture areas being at least partially overlapping;

computing an offset value based on a comparison of data of the overlapped first and second capture areas; and using the offset value as a feedback control signal for the next movement of the stage relative to the objective lens for a subsequent capture of data for a third image.

2. An apparatus for creating a magnified composite image of a specimen from aligned images tiles comprising:

an objective lens configured to magnify portions of the specimen;

a support configured to hold the specimen;

a drive configured to move the specimen relative to the objective lens through a predetermined distance;

an image capture system configured to capture and record data for a first magnified having a first central area with a predefined size and being surrounded on all sides by a first capture area;

the drive being configured to move the specimen relative to the objective lens through a predetermined distance for capturing with the image capture system, data for a second magnified image, having a second central area with the predefined size and being surrounded on all sides by a second capture area, the first capture area overlapping at least a portion of the second capture area; and a computing system configured to compute a correction offset based on a comparison of data for overlapped portions of the respective first and second capture areas for causing the drive to move the specimen relative to the objective lens through a distance modified by the correction offset from the predetermined distance for capture of a third magnified image having a third central area with the predefined size and being surrounded on all sides by a third capture area.

3. An apparatus in accordance with claim 2 wherein the computing system is configured to extract data for the first, second and third central areas to form first, second and third tiles for the magnified composite image.

4. An apparatus in accordance with claim 2 wherein the computing system evaluates pixel values of the respective image data of overlapped capture areas for aligning edges of tiles.

5. An apparatus in accordance with claim 2 wherein the drive comprises: a lead screw for moving a microscope stage relative to the objective lens and the computed offsets are used as feedback to adjust the distance the microscope stage is driven by the lead screw drive.

6. An apparatus in accordance with claim 2 wherein the drive comprises: an X-axis lead screw for driving in the X-direction; a Y-axis lead screw for driving in the Y-direction.

7. An apparatus for creating a tiled composite magnified image of a specimen formed of aligned image tiles comprising:
   a microscope having an objective lens configured to magnify images of the specimen;
   a stage configured to support the specimen;
   a drive configured to move the stage relative to the objective lens;
   an image sensor configured to capture data for first and second magnified images, the first magnified image having a first central area with a predefined size and being surrounded on all sides by a first capture areas, second magnified image having a second central area with the predefined size and being surrounded on all sides by a second capture area, the first and second capture areas being at least partially overlapping;
   a memory medium configured to store the first and second central areas as image tiles for the tiled composite image of the specimen; and
   a computing system configured to compute feedback control signals for subsequent movement of the drive, the feedback control signals being derived from the overlapping portions of the first and second capture areas to compensate for inaccuracies of stage travel relative to the objective lens.

8. An apparatus in accordance with claim 7 comprising: using the feedback control signals to maintain the capture images in the center of the image sensor so that overlapping areas of successive images are present to be used to compute feedback control signals.

9. A microscope image capture system for capturing a virtual microscope slide image of a specimen, comprising:
   a microscope having an objective lens;
   a stage configured to support the specimen;
   a lead screw drive configured to shift the stage relative to the objective lens;
   a computer control system having a computer-readable medium having computer-executable instructions comprising:
   an instruction for capturing data for first and second magnified images, the first magnified image having a first central area with a predefined size and being surrounded on all sides by a first captrue area, second magnified image having a second central area with the predefined size and being surrounded on all sides by a second capture area, the first and second capture areas being at least partially overlapping;
   another instruction for computing an offset value based on a comparison of data of the overlapped portions of the first and second central areas; and
   an instruction for using the offset value as a feedback control signal for the next relative movement of the stage relative to the objective lens for a subsequent capture of data for a third image.

* * * * *

UNITED STATES PATENT AND TRADEMARK OFFICE
CERTIFICATE OF CORRECTION

| | | |
|---|---|---|
| PATENT NO. | : 7,792,338 B2 | Page 1 of 1 |
| APPLICATION NO. | : 11/202045 | |
| DATED | : September 7, 2010 | |
| INVENTOR(S) | : Bacus et al. | |

It is certified that error appears in the above-identified patent and that said Letters Patent is hereby corrected as shown below:

IN THE CLAIMS

In claim 9, at column 18, line 17, after the word "first", delete "captrue" and insert --capture--

Signed and Sealed this
Twenty-second Day of February, 2011

David J. Kappos
*Director of the United States Patent and Trademark Office*